United States Patent
Wu et al.

(10) Patent No.: US 11,252,777 B2
(45) Date of Patent: Feb. 15, 2022

(54) COORDINATING RADIO RESOURCE CONTROL SIGNALING WITH UPPER LAYER DIRECT LINK ESTABLISHMENT PROCEDURES

(71) Applicant: QUALCOMM Incorporated, San Diego, CA (US)

(72) Inventors: Zhibin Wu, Los Altos, CA (US); Hong Cheng, Bridgewater, NJ (US); Sudhir Kumar Baghel, Hillsborough, NJ (US); Kapil Gulati, Hillsborough, NJ (US); Shailesh Patil, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 16/750,449

(22) Filed: Jan. 23, 2020

(65) Prior Publication Data

US 2020/0245394 A1 Jul. 30, 2020

Related U.S. Application Data

(60) Provisional application No. 62/797,290, filed on Jan. 27, 2019.

(51) Int. Cl.
*H04W 76/27* (2018.01)
*H04W 76/11* (2018.01)
(Continued)

(52) U.S. Cl.
CPC .......... *H04W 76/27* (2018.02); *H04W 4/40* (2018.02); *H04W 28/0268* (2013.01);
(Continued)

(58) Field of Classification Search
CPC ....... H04W 76/27; H04W 76/11; H04W 4/40; H04W 28/0268; H04W 80/02;
(Continued)

(56) References Cited

U.S. PATENT DOCUMENTS

2019/0387446 A1* 12/2019 Xu .......................... H04W 8/14
2020/0100088 A1* 3/2020 Kim ...................... H04W 88/04
(Continued)

OTHER PUBLICATIONS

3GPP TSG-RAN WG2 Meeting #105; R2-1901117; Source: vivo; Title: Signaling procedure details for sidelink unicast connecti Athens, Greece, Feb. 25-Mar. 1, 2019. (Year: 2019).*
(Continued)

*Primary Examiner* — Hassan A Phillips
*Assistant Examiner* — Mohammed S Chowdhury
(74) *Attorney, Agent, or Firm* — Danai Nelisile Mhembere; Holland & Hart LLP

(57) ABSTRACT

Methods, systems, and devices for wireless communications are described. A user equipment (UE) may initiate a radio resource control (RRC) layer signaling procedure between the UE and a target UE, include an upper layer signaling message in an RRC message based in part on the RRC layer signaling procedure, and transmit the RRC message including the upper layer signaling message to the target UE. Alternatively, upper layer signaling messages may be transmitted separately before or after the RRC layer signaling procedure.

25 Claims, 15 Drawing Sheets

(51) Int. Cl.
H04W 4/40 (2018.01)
H04W 28/02 (2009.01)
H04W 80/02 (2009.01)
H04W 80/08 (2009.01)
H04W 92/18 (2009.01)

(52) U.S. Cl.
CPC ............ *H04W 76/11* (2018.02); *H04W 80/02* (2013.01); *H04W 80/08* (2013.01); *H04W 92/18* (2013.01)

(58) Field of Classification Search
CPC ..... H04W 80/08; H04W 92/18; H04W 28/18; H04W 4/20; H04W 76/14
See application file for complete search history.

(56) References Cited

U.S. PATENT DOCUMENTS

| | | | | |
|---|---|---|---|---|
| 2020/0163005 | A1* | 5/2020 | Rao | H04W 48/16 |
| 2020/0205209 | A1* | 6/2020 | Pan | H04W 4/40 |
| 2020/0229007 | A1* | 7/2020 | Jung | H04W 72/04 |
| 2020/0229249 | A1 | 7/2020 | Cheng et al. | |
| 2020/0229262 | A1* | 7/2020 | Jung | H04W 36/0072 |
| 2020/0413457 | A1* | 12/2020 | Hong | H04W 48/20 |

OTHER PUBLICATIONS

Apple: "PC5 RRC Procedure Support", 3GPP Draft, 3GPP TSG-RAN WG2 Meeting #106, R2-1906774_RRC Signaling Over PC5_V1, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 3, 2019 (May 3, 2019), XP051711079, 4 Pages, Retrieved from the Internet: URL: http://www.3gpp.org/ftp/tsg%5Fran/WG2%5FRL2/TSGR2%5F106/Docs/R2%2D1906774%2Ezip, [retrieved on May 3, 2019], the whole document.
Ericsson: "On Sidelink Discovery", 3GPP Draft, 3GPP TSG-RAN WG2 #103-Bis, R2-1815039—On Sidelink Discovery, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 27, 2018 (Sep. 27, 2018), XP051524407, 3 Pages, Retrieved from the Internet: URL: http://www.3gpp.org/ftp/tsg%5Fran/WG2%5FRL2/TSGR2%5F103bis/Docs/R2%2D1815039%2Ezip, [retrieved on Sep. 27, 2018], the whole document.
International Search Report and Written Opinion—PCT/US2020/014933—ISAEPO—dated Jun. 29, 2020.
Vivo: "Signaling Procedure Details for Sidelink Unicast Connection Setup", 3GPP Draft, 3GPP TSG RAN WG2 Meeting #105, R2-1901117_Signaling Procedure Details for Sidelink Unicast Connection Setup, 3rd Generation Partnership Project (3GPP), Mobile Competence Centre, 650, Route Des Lucioles, F-06921 Sophia, vol. RAN WG2, No. Athens, Greece, Feb. 25, 2019-Mar. 1, 2019, Feb. 15, 2019 (Feb. 15, 2019), XP051602479, 6 Pages, Retrieved from the Internet: URL: http://www.3gpp.org/ftp/tsg%5Fran/WG2%5FRL2/TSGR2%5F105/Docs/R2%2D1901117%2Ezip, [retrieved on Feb. 15, 2019], the whole document.

* cited by examiner

COORDINATING RADIO RESOURCE CONTROL SIGNALING WITH UPPER LAYER DIRECT LINK ESTABLISHMENT PROCEDURES

CROSS REFERENCE

The present Application for Patent claims the benefit of U.S. Provisional Patent Application No. 62/797,290 by W U et al., entitled "COORDINATING RADIO RESOURCE CONTROL SIGNALING WITH UPPER LAYER DIRECT LINK ESTABLISHMENT PROCEDURES," filed Jan. 27, 2019, assigned to the assignee hereof, and expressly incorporated herein.

INTRODUCTION

The following relates to wireless communications, and more specifically to coordinating radio resource control (RRC) signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support direct communications between communications devices (e.g., direct communications between multiple UEs). Examples of direct communications may include, but are not limited to, device-to-device (D2D) communications, proximity services (ProSe) communications, vehicle-based communications, which may also be referred to as vehicle-to-everything (V2X) communications systems, vehicle-to-vehicle (V2V) communications systems, cellular V2X (C-V2X) communications systems, and the like. Some wireless communications systems, such as LTE systems, LTE-A systems, or LTE-A Pro systems, 5G systems, and V2X systems may support a procedure for establishing a connection between multiple UEs. The procedure may involve a series of handshake messages exchanged between the multiple UEs.

SUMMARY

A method of wireless communications at a UE is described. The method may include transmitting, via an RRC layer of the UE, an RRC message based on an RRC layer signaling procedure, and transmitting, via a V2X layer of the UE, an upper layer signaling message to a target UE before the RRC layer signaling procedure.

An apparatus for wireless communications at a UE is described. The apparatus may include a processor, and memory coupled to the processor. The processor and memory may be configured to transmit, via an RRC layer of the UE, an RRC message based on an RRC layer signaling procedure, and transmit, via a V2X layer of the UE, an upper layer signaling message to a target UE before the RRC layer signaling procedure.

Another apparatus for wireless communications at a UE is described. The apparatus may include means for transmitting, via an RRC layer of the UE, an RRC message based on an RRC layer signaling procedure, and transmitting, via a V2X layer of the UE, an upper layer signaling message to a target UE before the RRC layer signaling procedure.

A non-transitory computer-readable medium storing code for wireless communications at a UE is described. The code may include instructions executable by a processor to transmit, via an RRC layer of the UE, an RRC message based on an RRC layer signaling procedure, and transmit, via a V2X layer of the UE, an upper layer signaling message to a target UE before the RRC layer signaling procedure.

In some examples of the method, apparatuses, and non-transitory computer-readable medium described herein, the RRC layer signaling procedure includes an RRC connection procedure.

In some examples of the method, apparatuses, and non-transitory computer-readable medium described herein, the upper layer signaling message includes a request including a unicast type, an upper layer identifier of the target UE, an upper layer identifier of the UE, or a layer 2 (L2) identifier for the unicast type, or a combination thereof.

Some examples of the method, apparatuses, and non-transitory computer-readable medium described herein may further include operations, features, means, or instructions for receiving, from the target UE, a second upper layer signaling message including a response including an upper layer identifier of the target UE, or an L2 identifier for unicast communications, or a combination thereof.

Some examples of the method, apparatuses, and non-transitory computer-readable medium described herein may further include operations, features, means, or instructions for receiving, from the target UE, a second upper layer signaling message including a direct communications response including an upper layer identifier of the target UE, an L2 identifier for unicast communications, or an internet protocol (IP) address configuration, or a combination thereof.

Some examples of the method, apparatuses, and non-transitory computer-readable medium described herein may further include operations, features, means, or instructions for initiating the RRC layer signaling procedure between the UE and a target UE after transmitting the upper layer signaling message where transmitting the RRC message may be based on the RRC layer signaling procedure, and where the RRC message includes a request including a UE capability, a sidelink bearer configuration, a Quality-of-Service (QoS) parameter, or a transmit (Tx) profile parameter, or a combination thereof.

Some examples of the method, apparatuses, and non-transitory computer-readable medium described herein may further include operations, features, means, or instructions for receiving a second RRC message from the target UE based on the RRC layer signaling procedure, where the second RRC message includes a response including an access stratum (AS) layer capability, a sidelink bearer resource configuration response, a QoS parameter, or a Tx profile parameter, or a combination thereof. The method, apparatuses, and non-transitory computer-readable medium may further include operations, features, means, or instructions for transmitting, to the target UE, a third RRC message based on receiving the second RRC message from the target UE.

Some examples of the method, apparatuses, and non-transitory computer-readable medium described herein may further include operations, features, means, or instructions for receiving a second RRC message from the target UE based on the RRC layer signaling procedure, where the second RRC message includes a rejection, and releasing the RRC layer signaling procedure based on the rejection.

Some examples of the method, apparatuses, and non-transitory computer-readable medium described herein may further include operations, features, means, or instructions for performing a second RRC layer signaling procedure between the UE and a target UE based on the releasing and a backoff mechanism, where the backoff mechanism includes a timing delay between releasing the RRC layer signaling procedure and performing the second RRC layer signaling procedure.

In some examples of the method, apparatuses, and non-transitory computer-readable medium described herein, the upper layer signaling message includes a direct communications request including a unicast type, an upper layer identifier of the target UE, an upper layer identifier of the UE, an L2 identifier for the unicast type, an IP address configuration, or a nonce, or a combination thereof.

In some examples of the method, apparatuses, and non-transitory computer-readable medium described herein, the V2X layer signals the RRC layer to initiate the RRC layer signaling procedure.

A method of wireless communications at a UE is described. The method may include transmitting, via an RRC layer of the UE, an RRC message based on an RRC layer signaling procedure and transmitting, via a V2X layer of the UE, an upper layer signaling message to a target UE after the RRC layer signaling procedure.

An apparatus for wireless communications at a UE is described. The apparatus may include a processor, and memory coupled to the processor. The process and memory may be configured to transmit, via an RRC layer of the UE, an RRC message based on an RRC layer signaling procedure and transmit, via a V2X layer of the UE, an upper layer signaling message to a target UE after the RRC layer signaling procedure.

Another apparatus for wireless communications at a UE is described. The apparatus may include means for transmitting, via an RRC layer of the UE, an RRC message based on an RRC layer signaling procedure and transmitting, via a V2X layer of the UE, an upper layer signaling message to a target UE after the RRC layer signaling procedure.

A non-transitory computer-readable medium storing code for wireless communications at a UE is described. The code may include instructions executable by a processor to transmit, via an RRC layer of the UE, an RRC message based on an RRC layer signaling procedure and transmit, via a V2X layer of the UE, an upper layer signaling message to a target UE after the RRC layer signaling procedure.

In some examples of the method, apparatuses, and non-transitory computer-readable medium described herein, the RRC layer signaling procedure includes an RRC connection procedure.

In some examples of the method, apparatuses, and non-transitory computer-readable medium described herein, the upper layer signaling message includes a request including a unicast type, an upper layer identifier of the target UE, an upper layer identifier of the UE, or an L2 identifier for the unicast type, or a combination thereof.

Some examples of the method, apparatuses, and non-transitory computer-readable medium described herein may further include operations, features, means, or instructions for receiving, from the target UE, a second upper layer signaling message including a response including an upper layer identifier of the target UE, or an L2 identifier for unicast communications, or a combination thereof.

Some examples of the method, apparatuses, and non-transitory computer-readable medium described herein may further include operations, features, means, or instructions for receiving, from the target UE, a second upper layer signaling message including a direct communications response including an upper layer identifier of the target UE, an L2 identifier for unicast communications, or an IP address configuration, or a combination thereof.

Some examples of the method, apparatuses, and non-transitory computer-readable medium described herein may further include operations, features, means, or instructions for initiating the RRC layer signaling procedure between the UE and a target UE before transmitting the upper layer signaling message, where transmitting the RRC message may be based on the RRC layer signaling procedure. In some cases, the RRC message includes a request including a UE capability, a sidelink bearer configuration, a QoS parameter, or a Tx profile parameter, or a combination thereof.

Some examples of the method, apparatuses, and non-transitory computer-readable medium described herein may further include operations, features, means, or instructions for receiving a second RRC message from the target UE based on the RRC layer signaling procedure, where the second RRC message includes a response including an AS layer capability, a sidelink bearer resource configuration response, a QoS parameter, or a Tx profile parameter, or a combination thereof. The method, apparatuses, and non-transitory computer-readable medium may further include operations, features, means, or instructions for transmitting, to the target UE, a third RRC message based on receiving the second RRC message from the target UE.

Some examples of the method, apparatuses, and non-transitory computer-readable medium described herein may further include operations, features, means, or instructions for receiving a second RRC message from the target UE based on the RRC layer signaling procedure, where the second RRC message includes a rejection, and releasing the RRC layer signaling procedure based on the rejection.

Some examples of the method, apparatuses, and non-transitory computer-readable medium described herein may further include operations, features, means, or instructions for performing a second RRC layer signaling procedure between the UE and a target UE based on the releasing and a backoff mechanism, where the backoff mechanism includes a timing delay between releasing the RRC layer signaling procedure and performing the second RRC layer signaling procedure.

In some examples of the method, apparatuses, and non-transitory computer-readable medium described herein, the upper layer signaling message includes a direct communications request including a unicast type, an upper layer identifier of the target UE, an upper layer identifier of the UE, an L2 identifier for the unicast type, an IP address configuration, or a nonce, or a combination thereof.

In some examples of the method, apparatuses, and non-transitory computer-readable medium described herein, the V2X layer signals the RRC layer to initiate the RRC layer signaling procedure.

A method of wireless communications at a UE is described. The method may include initiating an RRC layer signaling procedure between the UE and a target UE, including an upper layer signaling message in an RRC message based on the RRC layer signaling procedure, and transmitting the RRC message including the upper layer signaling message to the target UE.

An apparatus for wireless communications at a UE is described. The apparatus may include a processor, and memory coupled to the processor. The processor and memory may be configured to initiate an RRC layer signaling procedure between the UE and a target UE, include an upper layer signaling message in an RRC message based on the RRC layer signaling procedure, and transmit the RRC message including the upper layer signaling message to the target UE.

Another apparatus for wireless communications at a UE is described. The apparatus may include means for initiating an RRC layer signaling procedure between the UE and a target UE, including an upper layer signaling message in an RRC message based on the RRC layer signaling procedure, and transmitting the RRC message including the upper layer signaling message to the target UE.

A non-transitory computer-readable medium storing code for wireless communications at a UE is described. The code may include instructions executable by a processor to initiate an RRC layer signaling procedure between the UE and a target UE, include an upper layer signaling message in an RRC message based on the RRC layer signaling procedure, and transmit the RRC message including the upper layer signaling message to the target UE.

In some examples of the method, apparatuses, and non-transitory computer-readable medium described herein, the RRC layer signaling procedure includes an RRC connection procedure.

In some examples of the method, apparatuses, and non-transitory computer-readable medium described herein, including the upper layer signaling message in the RRC message may include operations, features, means, or instructions for appending a payload of the upper layer signaling message to a payload of the RRC message.

In some examples of the method, apparatuses, and non-transitory computer-readable medium described herein, the RRC message includes a request including a UE capability, a sidelink bearer configuration, a QoS parameter, or a Tx profile parameter, or a combination thereof.

In some examples of the method, apparatuses, and non-transitory computer-readable medium described herein, the upper layer signaling message includes a direct communications request including a unicast type, an upper layer identifier of the target UE, an upper layer identifier of the UE, an L2 identifier for the unicast type, an IP address configuration, or a nonce, or a combination thereof.

Some examples of the method, apparatuses, and non-transitory computer-readable medium described herein may further include operations, features, means, or instructions for receiving, from the target UE, a second RRC message including a second upper layer signaling message based on the transmitting, and transmitting, to the target UE, a third RRC message based on receiving the second RRC message from the target UE.

In some examples of the method, apparatuses, and non-transitory computer-readable medium described herein, the second RRC message includes a connection setup response including an AS layer capability, a sidelink bearer resource configuration response, a QoS parameter, or a Tx profile parameter, or a combination thereof.

In some examples of the method, apparatuses, and non-transitory computer-readable medium described herein, the second upper layer signaling message includes a direct communications response including an upper layer identifier of the target UE, an L2 identifier for unicast communications, or an IP address configuration, or a combination thereof.

In some examples of the method, apparatuses, and non-transitory computer-readable medium described herein, the second RRC message includes a connection setup rejection.

In some examples of the method, apparatuses, and non-transitory computer-readable medium described herein, the second upper layer signaling message associated with the connection setup rejection includes a failure cause indication.

In some examples of the method, apparatuses, and non-transitory computer-readable medium described herein, the upper layer signaling message includes a discovery request including a unicast type, an upper layer identifier of the target UE, an upper layer identifier of the UE, or an L2 identifier for the unicast type, or a combination thereof.

Some examples of the method, apparatuses, and non-transitory computer-readable medium described herein may further include operations, features, means, or instructions for receiving, from the target UE, a second RRC message including a second upper layer signaling message based on the transmitting, and transmitting, to the target UE, a third RRC message based on receiving the second RRC message from the target UE.

In some examples of the method, apparatuses, and non-transitory computer-readable medium described herein, the second RRC message includes a connection setup response including an AS layer capability, a sidelink bearer resource configuration response, a QoS parameter, or a Tx profile parameter, or a combination thereof.

In some examples of the method, apparatuses, and non-transitory computer-readable medium described herein, the second upper layer signaling message includes a discovery response including an upper layer identifier of the target UE, or an L2 identifier for unicast communications, or a combination thereof.

Some examples of the method, apparatuses, and non-transitory computer-readable medium described herein may further include operations, features, means, or instructions for transmitting, to the target UE, a third upper layer signaling message including a direct communications request, where the direct communications request includes a unicast type, an upper layer identifier of the target UE, an upper layer identifier of the UE, an L2 identifier for the unicast type, an IP address configuration, or a nonce, or a combination thereof. Some examples of the method, apparatuses, and non-transitory computer-readable medium described herein may further include operations, features, means, or instructions for receiving, from the target UE, a fourth upper layer signaling message including a direct communications response, where the direct communications response includes an upper layer identifier of the target UE, an L2 identifier for unicast communications, or an IP address configuration, or a combination thereof.

Some examples of the method, apparatuses, and non-transitory computer-readable medium described herein may further include operations, features, means, or instructions for processing, by a V2X layer of the UE, the fourth upper layer signaling message, where receiving the fourth upper layer signaling message may be based on the processing.

Some examples of the method, apparatuses, and non-transitory computer-readable medium described herein may further include operations, features, means, or instructions for selecting a set of RRC information elements (IEs) of the RRC message, assigning the set of RRC IEs to the upper layer signaling message, and where the assigned set of RRC IEs carry information of the upper layer signaling message.

Some examples of the method, apparatuses, and non-transitory computer-readable medium described herein may further include operations, features, means, or instructions for processing, by an RRC layer of the UE, the RRC message including the assigned set of RRC IEs carrying the information of the upper layer signaling message, and transmitting, to a V2X layer, an indication of the RRC layer signaling procedure and the information carried in the upper layer signaling message.

A method for wireless communications at a UE is described. The method may include receiving an RRC message including an upper layer signaling message from an initiator UE based on an RRC layer signaling procedure between the UE and the initiator UE, including a second upper layer signaling message in a second RRC message based on the receiving, and transmitting the second RRC message including the second upper layer signaling message to the initiator UE.

An apparatus for wireless communications is described. The apparatus may include a processor, and memory coupled to the processor. The processor and memory may be configured to receive an RRC message including an upper layer signaling message from an initiator UE based on an RRC layer signaling procedure between the apparatus and the initiator UE, include a second upper layer signaling message in a second RRC message based on the receiving, and transmit the second RRC message including the second upper layer signaling message to the initiator UE.

Another apparatus for wireless communications is described. The apparatus may include means for receiving an RRC message including an upper layer signaling message from an initiator UE based on an RRC layer signaling procedure between the UE and the initiator UE, including a second upper layer signaling message in a second RRC message based on the receiving, and transmitting the second RRC message including the second upper layer signaling message to the initiator UE.

A non-transitory computer-readable medium storing code for wireless communications at a UE is described. The code may include instructions executable by a processor to receive an RRC message including an upper layer signaling message from an initiator UE based on an RRC layer signaling procedure between the UE and the initiator UE, include a second upper layer signaling message in a second RRC message based on the receiving, and transmit the second RRC message including the second upper layer signaling message to the initiator UE.

In some examples of the method, apparatuses, and non-transitory computer-readable medium described herein, including the second upper layer signaling message in the second RRC message may include operations, features, means, or instructions for appending a payload of the second upper layer signaling message to a payload of the second RRC message.

In some examples of the method, apparatuses, and non-transitory computer-readable medium described herein, the RRC message includes a connection setup request including a UE capability, a sidelink bearer configuration, a QoS parameter, or a Tx profile parameter, or a combination thereof.

In some examples of the method, apparatuses, and non-transitory computer-readable medium described herein, the second RRC message includes a connection setup response including an AS layer capability, a sidelink bearer resource configuration response, a QoS parameter, or a Tx profile parameter, or a combination thereof.

In some examples of the method, apparatuses, and non-transitory computer-readable medium described herein, the second upper layer signaling message includes a direct communications response including an upper layer identifier of the UE, an L2 identifier for unicast communications, or an IP address configuration, or a combination thereof.

In some examples of the method, apparatuses, and non-transitory computer-readable medium described herein, the upper layer signaling message includes a discovery request including a unicast type, an upper layer identifier of the UE, an upper layer identifier of the initiator UE, or an L2 identifier for the unicast type, or a combination thereof.

In some examples of the method, apparatuses, and non-transitory computer-readable medium described herein, the second upper layer signaling message includes a discovery response including an upper layer identifier of the UE, or an L2 identifier for unicast communications, or a combination thereof.

Some examples of the method, apparatuses, and non-transitory computer-readable medium described herein may further include operations, features, means, or instructions for receiving, from the initiator UE, a third upper layer signaling message including a direct communications request, where the direct communications request includes a unicast type, an upper layer identifier of the UE, an upper layer identifier of the initiator UE, an L2 identifier for the unicast type, an IP address configuration, or a nonce, or a combination thereof. Some examples of the method, apparatuses, and non-transitory computer-readable medium described herein may further include operations, features, means, or instructions for transmitting, to the initiator UE, a fourth upper layer signaling message including a direct communications response, where the direct communications response includes an upper layer identifier of the UE, an L2 identifier for unicast communications, or an IP address configuration, or a combination thereof.

Some examples of the method, apparatuses, and non-transitory computer-readable medium described herein may further include operations, features, means, or instructions for processing, by a V2X layer of the UE, the third upper layer signaling message, where receiving the third upper layer signaling message may be based on the processing.

Some examples of the method, apparatuses, and non-transitory computer-readable medium described herein may further include operations, features, means, or instructions for selecting a set of RRC IEs of the second RRC message, assigning the set of RRC IEs to the second upper layer signaling message, and where the assigned set of RRC IEs carry information of the second upper layer signaling message.

Some examples of the method, apparatuses, and non-transitory computer-readable medium described herein may further include operations, features, means, or instructions for processing, by an RRC layer of the UE, the second RRC message including the assigned set of RRC IEs carrying the information of the second upper layer signaling message, and where processing, by the RRC layer of the UE, the second RRC message includes.

A method for wireless communications at a UE is described. The method may include transmitting, via an RRC layer of the UE, an RRC message based on receiving a second RRC message from an initiator UE as part of an RRC layer signaling procedure and transmitting, via a V2X layer of the UE, an upper layer signaling message to an initiator UE before or after the RRC layer signaling procedure based on receiving a second upper layer signaling message from the initiator UE.

An apparatus for wireless communications is described. The apparatus may include a processor, and memory coupled to the processor. The processor and memory may be configured to transmit, via an RRC layer of the apparatus, an RRC message based on receiving a second RRC message from an initiator UE as part of an RRC layer signaling procedure and transmit, via a V2X layer of the apparatus, an upper layer signaling message to an initiator UE before or after the RRC layer signaling procedure based on receiving a second upper layer signaling message from the initiator UE.

Another apparatus for wireless communications is described. The apparatus may include means for transmitting, via an RRC layer of the apparatus, an RRC message based on receiving a second RRC message from an initiator UE as part of an RRC layer signaling procedure and transmitting, via a V2X layer of the apparatus, an upper layer signaling message to an initiator UE before or after the RRC layer signaling procedure based on receiving a second upper layer signaling message from the initiator UE.

A non-transitory computer-readable medium storing code for wireless communications at a UE is described. The code may include instructions executable by a processor to transmit, via an RRC layer of the UE, an RRC message based on receiving a second RRC message from an initiator UE as part of an RRC layer signaling procedure and transmit, via a V2X layer of the UE, an upper layer signaling message to an initiator UE before or after the RRC layer signaling procedure based on receiving a second upper layer signaling message from the initiator UE.

In some examples of the method, apparatuses, and non-transitory computer-readable medium described herein, the second upper layer signaling message includes a discovery request including a unicast type, an upper layer identifier of the UE, an upper layer identifier of the UE, or an L2 identifier for the unicast type, or a combination thereof.

In some examples of the method, apparatuses, and non-transitory computer-readable medium described herein, the upper layer signaling message includes a discovery response including an upper layer identifier of the initiator UE, or an L2 identifier for unicast communications, or a combination thereof.

In some examples of the method, apparatuses, and non-transitory computer-readable medium described herein, the second upper layer signaling message includes a direct communications request including a unicast type, an upper layer identifier of the UE, an upper layer identifier of the initiator UE, an L2 identifier for the unicast type, an IP address configuration, or a nonce, or a combination thereof.

In some examples of the method, apparatuses, and non-transitory computer-readable medium described herein, the upper layer signaling message includes a direct communications response including an upper layer identifier of the UE, an L2 identifier for unicast communications, or an IP address configuration, or a combination thereof.

DETAILED DESCRIPTION

Figure 1:
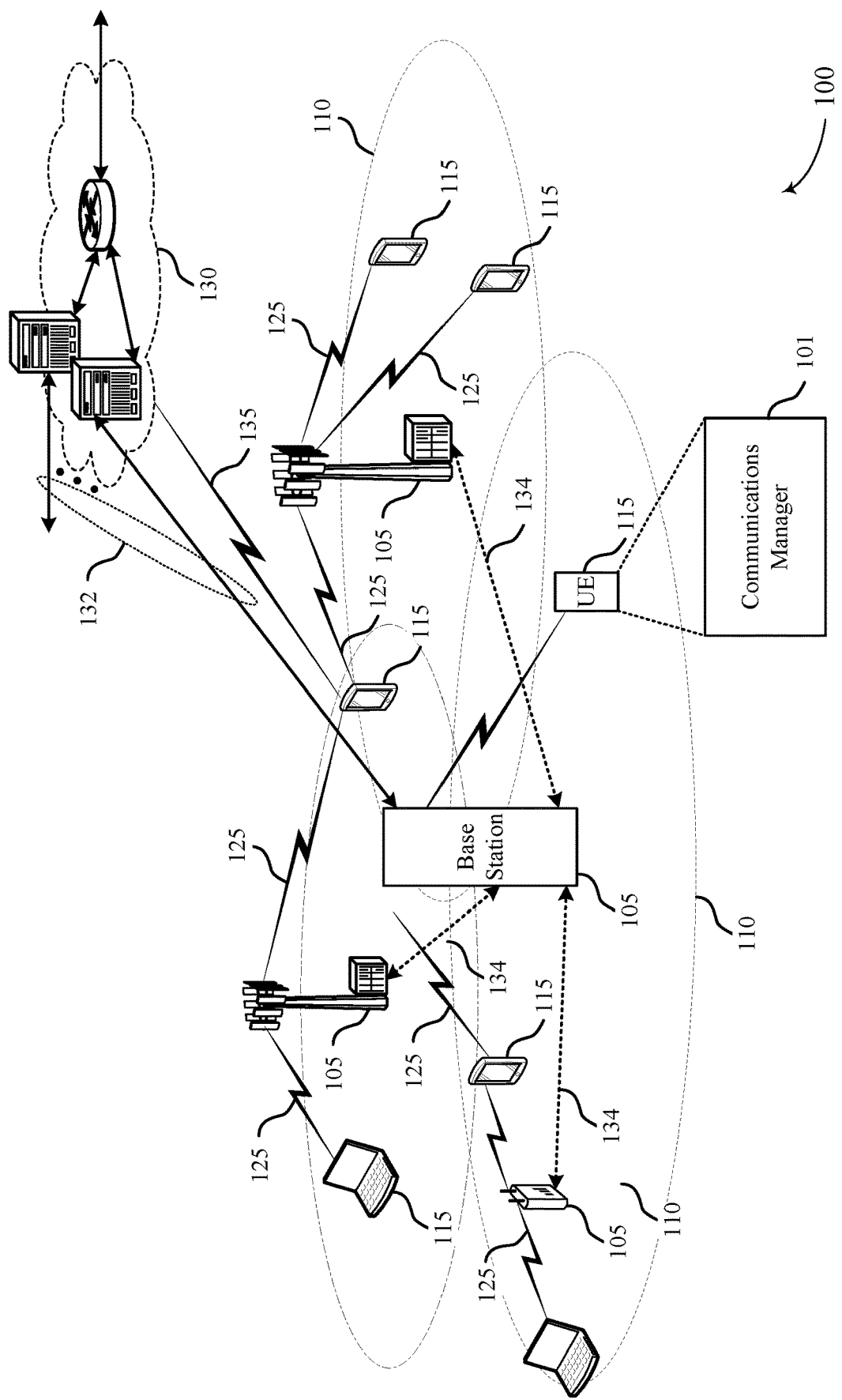
FIGS. 1 and 2 illustrate examples of wireless communications systems that support coordinating RRC signaling with upper layer direct link establishment procedures in accordance with one or more aspects of the present disclosure.

The described techniques may provide for enabling communication devices in sidelink communications (e.g., D2D communications systems, V2X communications systems, V2V communications systems, C-V2X communications systems, and the like) to reduce latencies associated with processes related to establishing a connection, for example, such as a unicast connection between communication devices. As part of establishing a unicast connection between at least two UEs, a first UE (e.g., an initiating UE) may initiate a layer signaling procedure (e.g., an RRC layer signaling procedure (e.g., an RRC connection setup procedure)) over sidelink communications with a second UE (e.g., a target UE). The initiating UE and the target UE may exchange communications related to the connection setup between the two UEs. For example, the initiating UE and target UE may exchange communications related to the connection setup via PC5 interface between the two UEs.

The PC5 interface may facilitate direct communications between at least two UEs without involving a network infrastructure (e.g., a base station (e.g., an eNodeB (eNB), a next-generation NodeB or giga-NodeB (either of which may be referred to as a gNB), and the like). The PC5 interface may also be a one-to-many communication interface (i.e., may be specified for group communications). From a higher layer (e.g., upper layer) point of view, the one-to-many communication interface may be reflected in the assignment of destination identifiers (e.g., UE identifiers, L2 identifiers). In some cases, a higher layer or upper layer may refer to layer 3 (L3) that may include RRC protocol, such as PC5-RRC signaling, where a PC5 may refer to a reference point a UE may use to directly communicate with another device (e.g., another UE). In some cases, L2 may include a Packet Data Convergence Protocol (PDCP) layer, a Radio Link Control (RLC) layer, an RRC layer, and a Medium Access Control (MAC) layer, and an L2 identifier may identify an L2 specific to a UE. Due to privacy requirements, in V2X communications systems, UEs may change the identifiers periodically in order to evade being trackable. To reduce latencies associated with processes related to establishing a connection and handling identifier changes associated with the connection, UEs performing a connection-related procedure may integrate upper layer signaling with RRC signaling. For example, both upper layer signaling (e.g., PC5 signaling (PC5-S)) and PC5-RRC may be available to the UEs. As such, UEs performing a connection-related procedure, for example, to establish a unicast connection and update identifiers associated with the unicast connection, may integrate upper layer signaling with RRC signaling to reduce latency in the network.

By way of example, an RRC layer of an initiating UE may include an upper layer signaling message (e.g., a PC5-S message) in an RRC message (e.g., a PC5-RRC message) and the initiating UE may transmit the PC5-RRC message to the target UE. The PC5-RRC message may include a connection setup request including a UE capability, a sidelink bearer configuration, a QoS profile, a transmission profile, or a combination thereof, while the PC5-S message may include a unicast type, an upper layer identifier of the target UE, an upper layer identifier of the initiating UE, an L2 identifier for the unicast type, an IP address configuration, or a nonce, or a combination thereof. The TX profile may be used to represent which radio access technology (RAT) (e.g., LTE or NR) or which physical layer transmission format to be used for the sidelink communication between the UE and the target UE. To include the PC5-S message in the PC5-RRC message, the initiating UE may append (e.g., encapsulate) a payload of the PC5-S message to a payload of the PC5-RRC message.

Alternatively, the initiating UE may define RRC IEs to replace the PC5-S message completely. That is, the RRC IEs may include information carried in the PC5-S message. In doing so, the initiating UE may avoid having to append an additional payload to the PC5-RRC message. Thus, the RRC layer of the initiating UE may process the PC5-S message or information carried in the PC5-S message to include the information or the PC5-S message in the PC5-RRC message. This may reduce the series of handshake messages exchanged between the multiple UEs. Alternatively, a V2X layer of an initiating UE may process (e.g., transmit) a PC5-S message after or before an AS layer of the initiating UE completes an RRC connection setup or by broadcasting the PC5-S message. For example, the V2X layer may transmit over a sidelink data radio bearer (e.g., on a user-plane) that is established by the RRC layer based in part on the RRC connection setup.

Therefore aspects of the disclosure may provide enhancements to the operation of UEs supporting direct communications, such as a D2D communications system, a V2X communications system, and the like. For example, by enabling UEs to integrate upper layer signaling with RRC signaling, operational characteristics, such as processor utilization and latency related to connection setup and maintaining connection information (e.g., identifiers) may be reduced. Further by enabling UEs to integrate upper layer signaling with RRC signaling, UEs in direct communications (e.g., in V2X communications) may support low end-to-end (E2E) latency and ultra-high reliability. This in return may benefit direct communications systems (e.g., V2X communications systems), for example, where conveying information to or from vehicles regarding inclement weather, nearby accidents, road conditions, and/or the activities of nearby vehicles may demand low E2E latency and ultra-high reliability.

Aspects of the disclosure are initially described in the context of a wireless communications system. An additional wireless communications system and process flows are then provided to illustrate aspects of the disclosure. Aspects of the disclosure are further illustrated by and described with reference to apparatus diagrams, system diagrams, and flowcharts that relate to coordinating RRC signaling with upper layer direct link establishment procedures.

FIG. 1 illustrates an example of a wireless communications system 100 that supports coordinating RRC signaling with upper layer direct link establishment procedures in accordance with one or more aspects of the present disclosure. The wireless communications system 100 includes base stations 105, UEs 115, and a core network 130. In some examples, the wireless communications system 100 may be an LTE network, an LTE-A network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or D2D protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through communication link 135.

The core network 130 may provide user authentication, access authorization, tracking, IP connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-AS (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, in the range of 300 megahertz (MHz) to 300 gigahertz (GHz). The region from 300 MHz to 3 GHz may be known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. In some examples, the wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other UEs.

The wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) RAT, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. A RLC layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval. In other cases, a smallest scheduling unit of the wireless communications system 100 may be shorter than a subframe or may be dynamically selected (e.g., in bursts of shortened transmission time intervals or in selected component carriers using shortened transmission time intervals). In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given RAT. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different RATs (e.g., LTE, LTE-A, LTE-A Pro, NR). For example, communications over a carrier may be organized according to transmission time intervals or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular RAT (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth. For example, the wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter transmission time interval duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A transmission time interval in eCC may consist of one or multiple symbol periods. In some cases, the transmission time interval duration (that is, the number of symbol periods in a transmission time interval) may be variable. The wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some examples of wireless communications system 100 may support direct communications, such as a D2D communications system, a V2X communications system (or other communications systems such as a V2V communications system, a C-V2X communications system), and the like. UEs 115 in a V2X communications system, and the like may have a direct connection to other UEs 115, which may be a sidelink connection (e.g., a V2V connection, a V2X connection, and/or the like). For wireless communications systems, such as V2X communications system, data transmissions (e.g., target traffic) may be periodically broadcasted between UEs 115 via the sidelink connection. For example, in V2X communications, a UE 115 (e.g., a vehicle) may broadcast safety messages (with a known size) periodically to enable nearby UEs 115 (e.g., vehicles, sensors) to receive information, such as nearby accidents, road conditions, or activities of nearby vehicles, and the like.

Due to security and privacy requirements, in V2X communications systems, UEs 115 may change identifiers periodically in order to evade being trackable. As part of establishing a unicast connection between at least two UEs 115, a UE 115 (e.g., an initiating UE) may initiate a layer signaling procedure (e.g., a unicast connection setup procedure) over a sidelink communications with another UE 115 (e.g., a target UE). The layer signaling procedure may be an RRC layer signaling procedure, a V2X layer signaling procedure, and/or the like. The initiating UE and the target UE may exchange communications related to the unicast connection setup via PC5 interface between the two UEs 115 (e.g., L2 identifiers, and the like). In reducing latencies associated with processes related to establishing a connection and handling identifier changes associated with the connection, because both upper layer signaling (e.g., PC5-S) and PC5-RRC are available to UEs 115, UEs 115 performing a layer signaling procedure, for example, to establish a unicast connection and update identifiers associated with the unicast connection may integrate upper layer signaling with RRC signaling.

One or more UEs 115 may include a communications manager 101 that may manage communications with other UEs 115. For example, UEs 115 may include a communications manager 101, which may initiate an RRC layer signaling procedure between an initiating UE 115 and a target UE 115, include an upper layer signaling message in an RRC message based in part on the RRC layer signaling procedure, and transmit the RRC message including the upper layer signaling message to the target UE. The communications manager 101 may transmit, via an RRC layer of a UE 115, an RRC message based in part on an RRC layer signaling procedure, and transmit, via V2X layer of the UE 115, an upper layer signaling message to a target UE 115 before or after the RRC layer signaling procedure.

The communications manager 101 may additionally, or alternatively receive an RRC message including an upper layer signaling message from an initiator UE 115 based in part on an RRC layer signaling procedure between the UE 115 and the initiator UE 115, include a second upper layer signaling message in a second RRC message based in part on the reception, and transmit the second RRC message including the second upper layer signaling message to the initiator UE 115. The communications manager 101 may additionally, or alternatively transmit, via an RRC layer of the UE 115, an RRC message based in part on receiving a second RRC message from an initiator UE 115 as part of an RRC layer signaling procedure, and transmit, via a V2X layer of the UE 115, an upper layer signaling message to an initiator UE 115 before or after the RRC layer signaling procedure based in part on receiving a second upper layer signaling message from the initiator UE 115.

Figure 2:
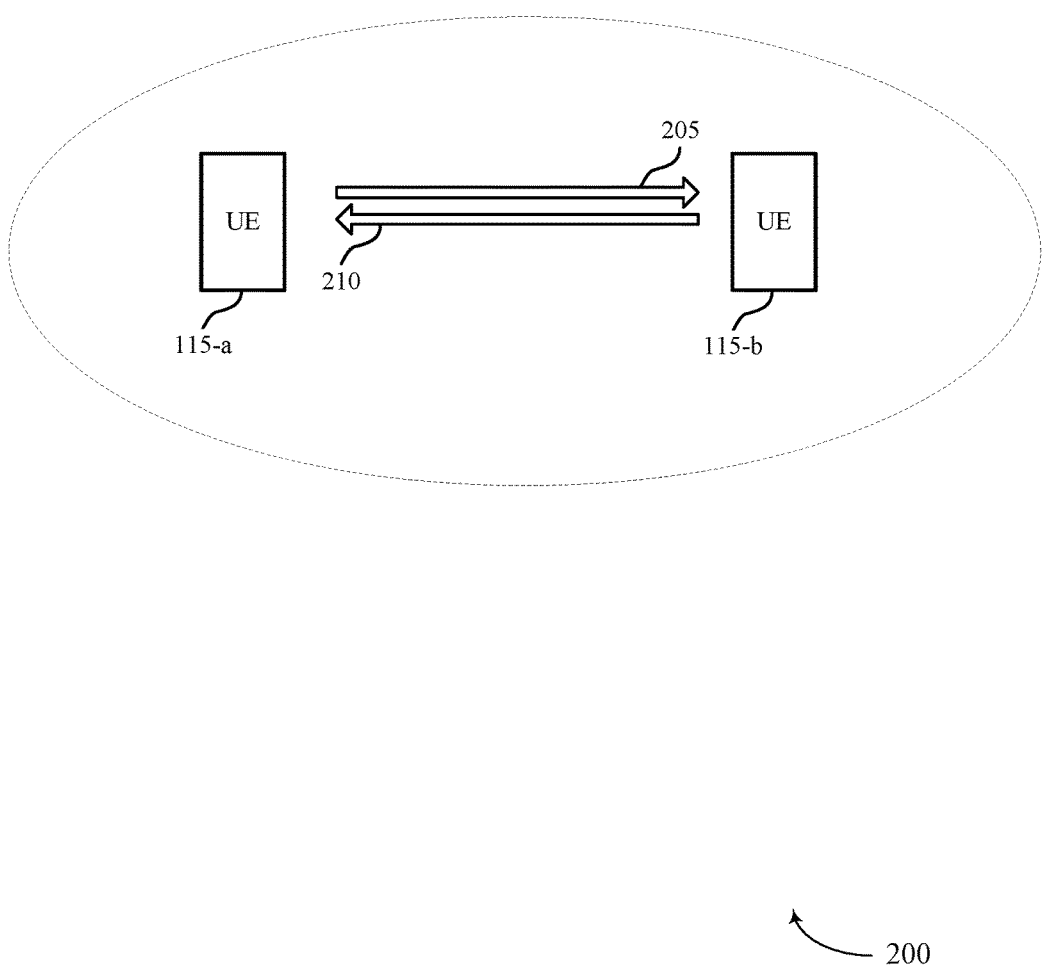

FIG. 2 illustrates an example of a wireless communications system 200 that supports coordinating RRC signaling with upper layer direct link establishment procedures in accordance with one or more aspects of the present disclosure. The wireless communications system 200 may include a UE 115-a and a UE 115-b, which may be examples of the corresponding devices described with reference to FIG. 1. In some examples, the wireless communications system 200 may implement aspects of the wireless communications system 100. For example, the wireless communications system 200 may support integration of upper layer signaling with RRC signaling.

As described herein, the UE 115-a may attempt to establish a connection (e.g., a unicast connection) over a sidelink with the UE 115-b. In some examples, the wireless communications system 200 may support sidelink, broadcast, groupcast, and unicast transmission for any UEs that are in-coverage, out-of-coverage, or in partial-coverage, or a combination thereof. By way of example, the UE 115-a and the UE 115-b may be vehicles, where the connection over the sidelink may be a V2X communication link between the UE 115-a (e.g., a first vehicle) and the UE 115-b (e.g., a second vehicle). Additionally or alternatively, the connection over the sidelink may be used for sidelink communications between the UE 115-a and the UE 115-b. In some examples, the UE 115-a may be referred to as an initiating UE that initiates a layer signaling procedure to establish a connection (e.g., a unicast connection), and the UE 115-b may be referred to as a target UE that is targeted for the connection by the UE 115-a. The layer signaling procedure may be an RRC layer signaling procedure, a V2X layer signaling procedure, and/or the like related to establishing a connection (e.g., via an RRC connection procedure, or the like).

As part of establishing a connection, the UE 115-a and the UE 115-b may exchange communications related to the connection via a PC5 interface. The PC5 interface may be a one-to-many communication interface, which may be reflected in the assignment of one or more identifiers (e.g., one or more UE identifiers). In some examples, a security association may be established between the UE 115-a and the UE 115-b for the connection based in part on the identifier(s). The identifier(s) may indicate which UE is transmitting which message and/or which UE the message is intended for. As such, traffic (e.g., unicast traffic) may benefit from security protection at a link level (e.g., Integrity Protection). Due to privacy requirements, in V2X communications systems, the UE 115-a and the UE 115-b may change one or more identifiers periodically in order to evade being trackable. To reduce latencies associated with processes related to establishing a connection and handling (e.g., updating, identifying) identifiers associated with the connection, because both upper layer signaling (e.g., PC5-S) and PC5-RRC are available to the UE 115-a and the UE 115-b, the UE 115-a and the UE 115-b may integrate upper layer signaling with RRC signaling.

According to an example technique, the UE 115-a and the UE 115-b may integrate upper layer signaling with RRC signaling. The UE 115-a (e.g., the initiating UE) may transmit an RRC message to the UE 115-b, such as a connection request message (e.g., an RRC_SL_SETUP_REQ message). The connection request message may include a UE capability, a sidelink bearer configuration, QoS-related parameters, or a Tx profile parameter, or a combination thereof. In some examples, the RRC message may also include an upper layer signaling message (or information carried in the upper layer signaling message). For example, the upper layer signaling message may be a direct communications request message (e.g., DIRECT_COMM_REQUEST message). The direct communications request message may carry information, such as a unicast type, an upper layer identifier of the UE 115-b, an upper layer identifier of the UE 115-a, an L2 identifier for the unicast type, an IP address configuration, or a nonce, or a combination thereof.

In some examples, for each L2 identifier, the UE 115-a and/or the UE 115-b may maintain an RRC state. In some examples, the UE 115-a and/or the UE 115-b may reuse an RRC state of NR Uu interface, for example, an RRC idle state, an RRC inactive state, and an RRC connected state. An RRC setup procedure may also be used for the UE 115-a and/or the UE 115-b in the RRC inactive state. In the RRC inactive state, AS layers may have some context information stored about a peer UE (e.g., the UE 115-b) based on a prior sidelink communication. The stored context information may be used to enhance unicast for the RRC message (e.g., an RRCSLConnectionSetup message) for RRC connection establishment (e.g., using known modulation coding schemes (MCS) used in prior transmission, or using a beam pair link (BPL) for mmW V2X sidelink communications, and/or the like).

The UE 115-a may integrate the upper layer signaling message with the RRC message, for example, by appending (e.g., encapsulating) a payload of the upper layer signaling message to a payload of the RRC message. Alternatively, in some examples, the UE 115-a may define a set of RRC IEs to replace the upper layer signaling message (e.g., a DIRECT_COMM_REQUEST message). That is, the RRC IEs may include information carried in the upper layer signaling message. In doing so, the UE 115-a (e.g., the initiating UE) may avoid having to append an additional payload to the RRC message.

The UE 115-a may use a sidelink signaling radio bearer (SRB) to transport the RRC message including the upper layer signaling message via communication link 205. Upon receiving the RRC message, the UE 115-b may determine whether to accept or reject the connection request message. The UE 115-b may base this determination, for example, on a transmission and/or reception capability, an ability to accommodate a connection (e.g., a unicast connection) over a sidelink, a particular service indicated for the connection, the contents to be transmitted over the connection, or a combination thereof. Based on the determination, the UE 115-b may transmit an RRC message to the UE 115-a.

For example, the UE 115-b may evaluate the connection request message received from the UE 115-a, and in return transmit a connection response message. Similar to the UE 115-*a* and the connection request, the UE 115-*b* may use a sidelink SRB to transport the connection response via communication link 210. In an example, the UE 115-*b* may transmit a connection accept message (e.g., an RRCSLSetup, an RRC_SL_ACCEPT message). The connection response message may include configuration information for an SRB (e.g., SRB1) on which subsequent messages can be transferred on. Additionally, the connection response message may include default configuration for SRB1 but can also include configuration information for physical uplink shared channels (PUSCH), physical uplink control channels (PUCCH), physical downlink shared channels (PDSCH) physical channels, channel quality indicator (CQI) reports, sounding reference signals (SRSs), antenna configuration and scheduling requests, or a combination thereof.

The connection response message may additionally, or alternatively, include a direct communications response message (e.g., a DIRECT_COMM_ACCEPT message). In some examples, the UE 115-*b* may include the direct communications response message, as part of the RRC message, based in part on the acceptance of the connection request. Alternatively, the UE 115-*b* may reject the connection request, based in part on being unable to accommodate the connection over a sidelink due to a limited radio resource, a scheduling issue, etc. In this example, the UE 115-*b* may transmit a connection reject message (e.g., an RRC_SL_REJECT message).

The connection reject message may include a failure cause indication, which may include AS layer reasons for rejecting the connection setup (e.g., unable to match capabilities, QoS above a threshold, unable to configure bearer, and/or the like). Additionally, or alternatively, the failure cause indication may include V2X layer reasons. The connection response message may additionally, or alternatively, include a direct communications response message (e.g., a DIRECT_COMM_REJECT message). In some examples, the UE 115-*b* may include the direct communications response message, as part of the RRC message, based in part on the failure cause indication. For example, if the connection is rejected based in part on the AS layer but not the V2X layer, the UE 115-*b* may refrain from including the direct communications response message (e.g., a DIRECT_COMM_REJECT message) in the RRC message.

According to the above example technique, by enabling the UE 115-*a* and the UE 115-*b* to integrate upper layer signaling with RRC signaling, operational characteristics, such as processor utilization and latency related to unicast connection setup and maintaining connection information (e.g., identifiers) may be reduced. Aspects of the above example technique may be further advantageous for application layer discovery of L2 identifiers, or when discovery of L2 identifiers is executed as a V2X layer procedure ahead of RRC connection setup, or when discover of L2 identifiers is part of the extended signaling for direct link setup procedure.

According to another example technique, a V2X layer (of the UE 115-*a* and/or the UE 115-*b*) may trigger an RRC connection setup procedure, and then use the established sidelink data radio bearer to transport V2X layer signaling messages. By way of example, the UE 115-*a* (e.g., the initiating UE) may transmit an upper layer signaling message (e.g., a DISCOVER_TARGET_REQ message) to the UE 115-*b*. In some examples, the discovery request message may carry information, such as a unicast type, an upper layer identifier of the UE 115-*b*, an upper layer identifier of the UE 115-*a*, or an L2 identifier for the unicast type, or a combination thereof. A V2X layer of the UE 115-*b* may process the upper layer signaling message (e.g., a DISCOVER_TARGET_REQ message) transmitted by the UE 115-*a*, and create a discovery response message (e.g., a DISCOVER_TARGET_RESP message). The discovery response message may carry information, such as an upper layer identifier of the UE 115-*b*, or an L2 identifier for unicast communications, or a combination thereof.

Once the UE 115-*a* receives the discovery response message from the UE 115-*b*, the UE 115-*a* may transmit an RRC message, such as a connection setup request message (e.g., an RRCSLSetupRequest message) to the UE 115-*b*. For example, a V2X layer of the UE 115-*a* may trigger lower layers (e.g., an AS layer) of the UE 115-*a* to initiate a connection setup procedure (e.g., an RRC connection setup procedure). The connection setup request message may carry information, such as a UE capability, a sidelink bearer configuration, QoS-related parameters, or a Tx profile parameter, or a combination thereof. The UE 115-*b* may receive and, in return, transmit an RRC message to the UE 115-*a*, such as a connection setup response message (e.g., RRCSLSetupAccept message).

The connection setup response message may carry information, such as an AS layer capability of the UE 115-*b*, a sidelink bearer resource configuration response, QoS-related parameters, or a Tx profile parameter, or a combination thereof. In some examples, the UE 115-*b* may determine whether to accept or reject the connection setup request based in part on the information provided in the connection setup request message. The UE 115-*b* may make this determination based in part on transmission/reception capability, an ability to accommodate a unicast connection over a sidelink, a particular service indicated for the unicast connection, the contents to be transmitted over the unicast connection, or a combination thereof. The UE 115-*a* may, transmit an RRC message, to indicate that the connection setup is complete, for example, a connection setup complete message (e.g., RRCSLSetupComplete message).

In some examples, based in part on establishing the connection, one or more data radio bears may also be established, for example, over a sidelink between the UE 115-*a* and the UE 115-*b*. The UE 115-*a* may transmit an upper layer signaling message, such as a direct communications request message (e.g., a DIRECT_COMM_REQUEST message) to the UE 115-*b* using the one or more data radio bears. The direct communications request message may carry information, such as a unicast type, an upper layer identifier of the UE 115-*b*, an upper layer identifier of the UE 115-*a*, an L2 identifier for the unicast type, an IP address configuration, or a nonce, or a combination thereof. The UE 115-*b* may receive the direct communications request message and transmit an upper layer signaling message, such as a direct communications response message (e.g., a DIRECT_COMM_ACCEPT message) to the UE 115-*a*. Similarly, the direct communications response message may carry information, such as an upper layer identifier of the UE 115-*a*, an L2 identifier for unicast communications, or an IP address configuration, or a combination thereof. Thus, according to the above example technique, a V2X layer of the UE 115-*a* and the UE 115-*b* may trigger an RRC connection setup procedure, and then use the established sidelink data radio bearer to transport V2X layer signaling messages. This in return may benefit the UEs during the direct link connection setup, for example, by reducing overhead signaling.

According to an alternative example technique, a direct link setup in V2X layer may be completed, and the V2X layer may then trigger the RRC connection setup procedure to set up an AS connection. Here, the UE 115-*a* may transmit an upper layer signaling message, such as a direct communications request message (e.g., a DIRECT_COMM_REQUEST message) to the UE 115-*b*. The direct communications request message may carry information, such as a unicast type, an upper layer identifier of the UE 115-*b*, an upper layer identifier of the UE 115-*a*, an L2 identifier for the unicast type, an IP address configuration, or a nonce, or a combination thereof.

The UE 115-*b* may, in response, transmit an upper layer signaling message, such as a direct communications response message (e.g., DIRECT_COMM_ACCEPT message) to the UE 115-*a*. The UE 115-*a* and the UE 115-*b* may establish a security association (e.g., a security context) for the unicast connection based in part on the information exchanged in the upper layer signaling messages. Thus, the exchange of the upper layer signaling messages between the UE 115-*a* and the UE 115-*b* may carry information to facilitate establishing a connection (e.g., a unicast connection). In some examples, the exchange of the upper layer signaling messages between the UE 115-*a* and the UE 115-*b* may be performed using a sidelink radio bearer (e.g., SRB1) to transport the upper layer signaling messages. The UE 115-*a* may, in response, transmit an RRC message to the UE 115-*b*. For example, after the exchange of the upper layer signaling messages (e.g., after PC5-S is completed), a V2X layer of the UE 115-*a* may trigger lower layers (e.g., an AS layer) of the UE 115-*a* to initiate a connection setup procedure (e.g., an RRC connection setup procedure). Thus, the RRC message may be a connection setup request message (e.g., RRCSLSetupRequest message), and the UE 115-*a* and the UE 115-*b* may perform an RRC connection setup procedure as described earlier (e.g., via RRC layer signaling).

Figure 3:
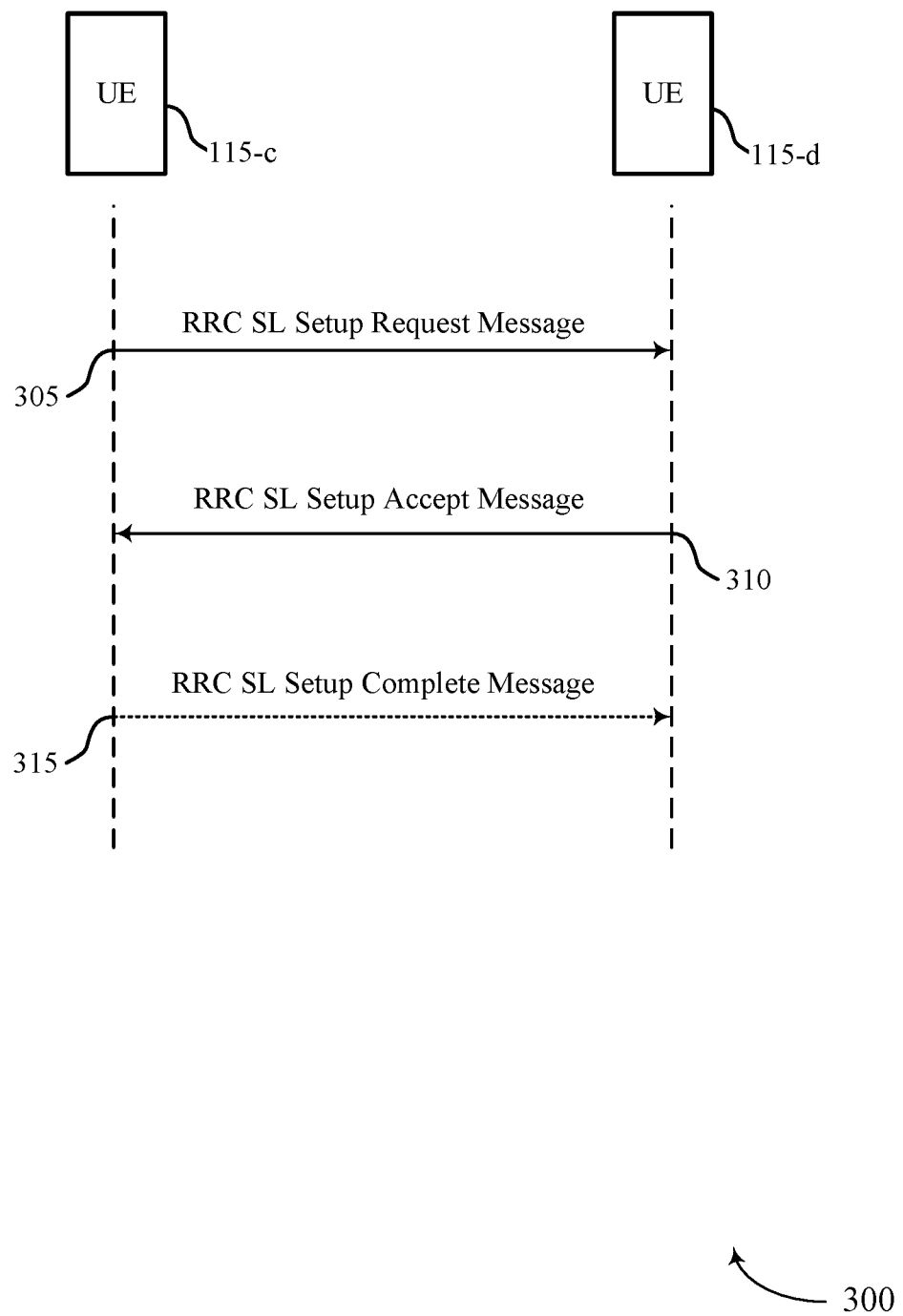
FIGS. 3 through 7 illustrate examples of process flows that support coordinating RRC signaling with upper layer direct link establishment procedures in accordance with one or more aspects of the present disclosure.

Thus, according to the above alternative technique, by enabling UEs to exchange upper layer signaling messages without encapsulation to RRC messages, prior to exchanging RRC messaging during an RRC connection setup, may allow the UE 115-*a* and the UE 115-*b* to use a security association (e.g., security context), established as part of the upper layer signaling messaging, during the RRC connection setup. This in return may benefit the UE 115-*a* and the UE 115-*b* during the RRC connection setup, for example, by reducing overhead signaling related to establishing the security association FIG. 3 illustrates an example of a process flow 300 that supports coordinating RRC signaling with upper layer direct link establishment procedures in accordance with one or more aspects of the present disclosure. In some examples, the process flow 300 may implement aspects of the wireless communications systems 100 and 200. The process flow 300 may include a UE 115-*c* and a UE 115-*d* which may be examples of the corresponding devices described with reference to FIGS. 1 and 2. The UE 115-*c* may be referred to as an initiating UE that initiates a layer signaling procedure, and UE 115-*d* may be referred to as a target UE that is targeted for the layer signaling procedure by the initiating UE 115-*c*. The layer signaling procedure may be an RRC layer signaling procedure, a V2X layer signaling procedure, and/or the like.

In the following description of the process flow 300, the operations between the UE 115-*c* and the UE 115-*d* may be transmitted in a different order than the exemplary order shown, or the operations performed by the UE 115-*c* and the UE 115-*d* may be performed in different orders or at different times. Certain operations may also be omitted from the process flow 300, and/or other operations may be added to the process flow 300.

At 305, the UE 115-*c* may transmit an RRC message to the UE 115-*d*, such as a connection request message (e.g., an RRC_SL_SETUP_REQ message). The connection request message may include a UE capability, a sidelink bearer configuration, QoS-related parameters, or a Tx profile parameter, or a combination thereof. In some examples, the RRC message may also include an upper layer signaling message (or information carried in the upper layer signaling message). In some examples, the upper layer signaling message may be a direct communications request message (e.g., a DIRECT_COMM_REQUEST message). The direct communications request message may carry information, such as a unicast type, an upper layer identifier of the UE 115-*d*, an upper layer identifier of the UE 115-*c*, an L2 identifier for the unicast type, an IP address configuration, or a nonce, or a combination thereof.

At 310, the UE 115-*d* may transmit an RRC message to the UE 115-*c*. For example, the UE 115-*d* may evaluate the connection request message received from the UE 115-*c*, and in return transmit a connection response message. In this example, the UE 115-*d* may transmit a connection accept message (e.g., an RRC_SL_ACCEPT message). The connection response message may additionally, or alternatively, include a direct communications response message (e.g., a DIRECT_COMM_ACCEPT message). In some examples, the UE 115-*d* may include the direct communications response message as part of the RRC message based in part on the acceptance of the connection request.

At 315, the UE 115-*c* may, in response, transmit an RRC message, to indicate that the connection setup is complete, for example, a connection setup complete message (e.g., an RRCSLSetupComplete message). In some examples, the operation at 315 may be optional and omitted from the process flow 300.

Therefore aspects of the process flow 300 may provide enhancements to the operation of UEs supporting direct communications such as V2X communications systems, and the like. For example, by enabling UEs to integrate upper layer signaling with RRC signaling, operational characteristics, such as processor utilization and latency related to unicast connection setup and maintaining connection information may be reduced. Aspects of the process flow 300 may be further advantageous for application layer discovery of L2 identifiers, or when discovery of L2 identifiers is executed as a V2X layer procedure ahead of RRC connection setup, or when discovery of L2 identifiers is part of the extended signaling for direct link setup procedure.

Figure 4:
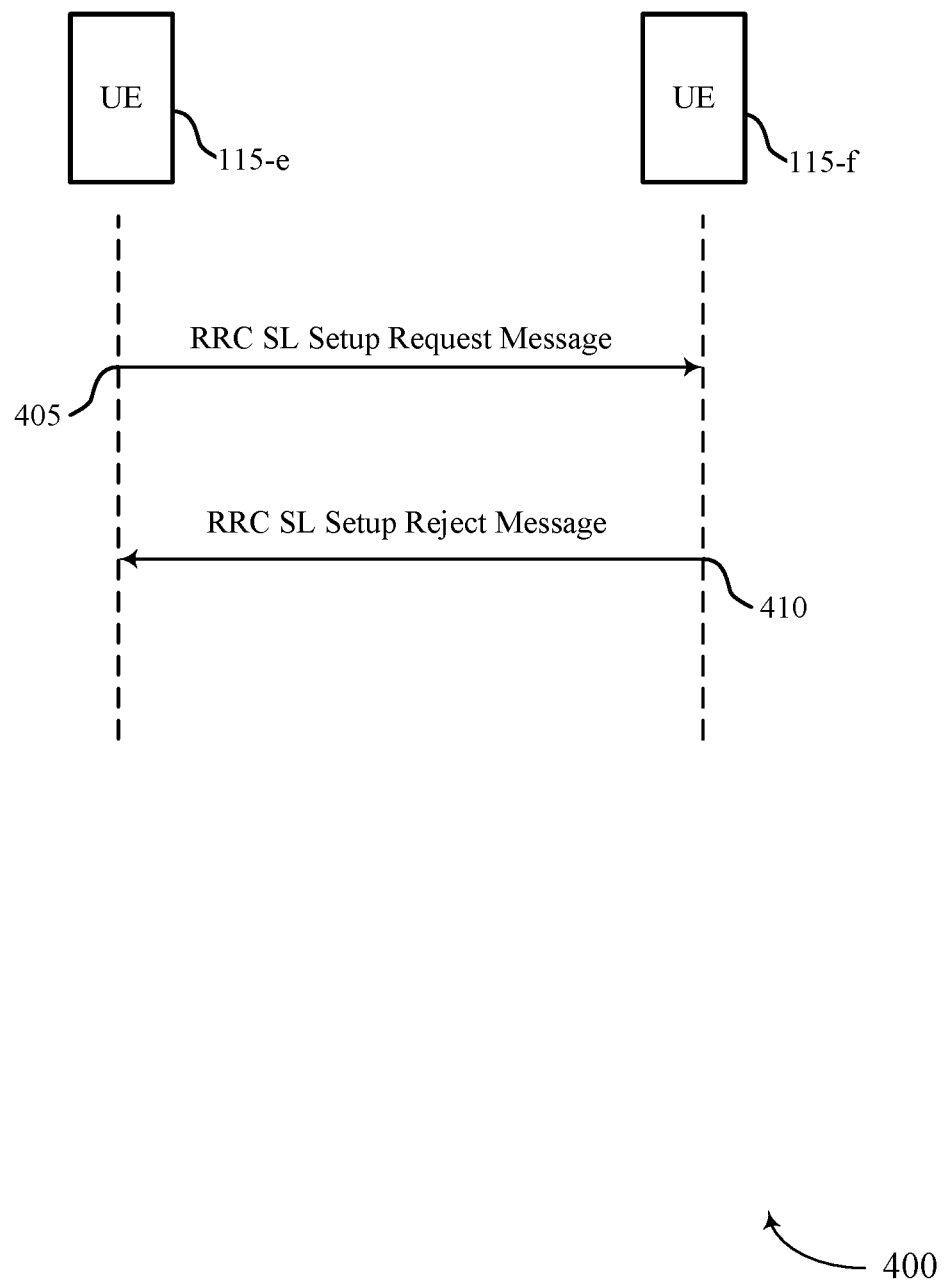

FIG. 4 illustrates an example of a process flow 400 that supports coordinating RRC signaling with upper layer direct link establishment procedures in accordance with one or more aspects of the present disclosure. In some examples, the process flow 400 may implement aspects of the wireless communications systems 100 and 200. The process flow 400 may include a UE 115-*e* and a UE 115-*f* which may be examples of the corresponding devices described with reference to FIGS. 1 and 2. The UE 115-*e* may be referred to as an initiating UE that initiates a layer signaling procedure, and UE 115-*f* may be referred to as a target UE that is targeted for the layer signaling procedure by the initiating UE 115-*e*. The layer signaling procedure may be an RRC layer signaling procedure, a V2X layer signaling procedure, and/or the like.

In the following description of the process flow 400, the operations between the UE 115-*e* and the UE 115-*f* may be transmitted in a different order than the exemplary order shown, or the operations performed by the UE 115-*e* and the UE 115-*f* may be performed in different orders or at different times. Certain operations may also be omitted from the process flow 400, and/or other operations may be added to the process flow 400.

At 405, the UE 115-*e* may transmit an RRC message to the UE 115-*f*, such as a connection request message (e.g., an RRC_SL_SETUP_REQ message). The connection request message may include a UE capability, a sidelink bearer configuration, QoS-related parameters, or a Tx profile parameter, or a combination thereof. In some examples, the RRC message may also include an upper layer signaling message (or information carried in the upper layer signaling message). In some examples, the upper layer signaling message may be a direct communications request message (e.g., a DIRECT_COMM_REQUEST message). The direct communications request message may carry information, such as a unicast type, an upper layer identifier of the UE 115-*f*, an upper layer identifier of the UE 115-*e*, an L2 identifier for the unicast type, an IP address configuration, or a nonce, or a combination thereof.

At 410, the UE 115-*f* may transmit an RRC message to the UE 115-*e*. For example, the UE 115-*e* may evaluate the connection request message received from the UE 115-*e*, and in return, transmit a connection response message. In this example, the UE 115-*e* may transmit a connection reject message (e.g., an RRC_SL_REJECT message). The connection reject message may include a failure cause indication, which may include AS layer reasons for rejecting the connection setup (e.g., unable to match capabilities, QoS above a threshold, unable to configure bearer, and/or the like). Additionally, or alternatively, the failure cause indication may include V2X layer reasons. The connection response message may additionally, or alternatively, include a direct communications response message (e.g., a DIRECT_COMM_REJECT message). In some examples, the UE 115-*f* may include the direct communications response message as part of the RRC message based in part on the failure cause indication. For example, if the connection is rejected based in part on the AS layer but not the V2X layer, the UE 115-*f* may refrain from including the direct communications response message (e.g., a DIRECT_COMM_REJECT message) in the RRC message.

Therefore aspects of the process flow 400 may provide enhancements to the operation of UEs supporting direct communications such as V2X communications systems, and the like. For example, by enabling UEs to integrate upper layer signaling with RRC signaling, operational characteristics, such as processor utilization and latency related to unicast connection setup and maintaining connection information (e.g., one or more identifiers) may be reduced.

Figure 5:
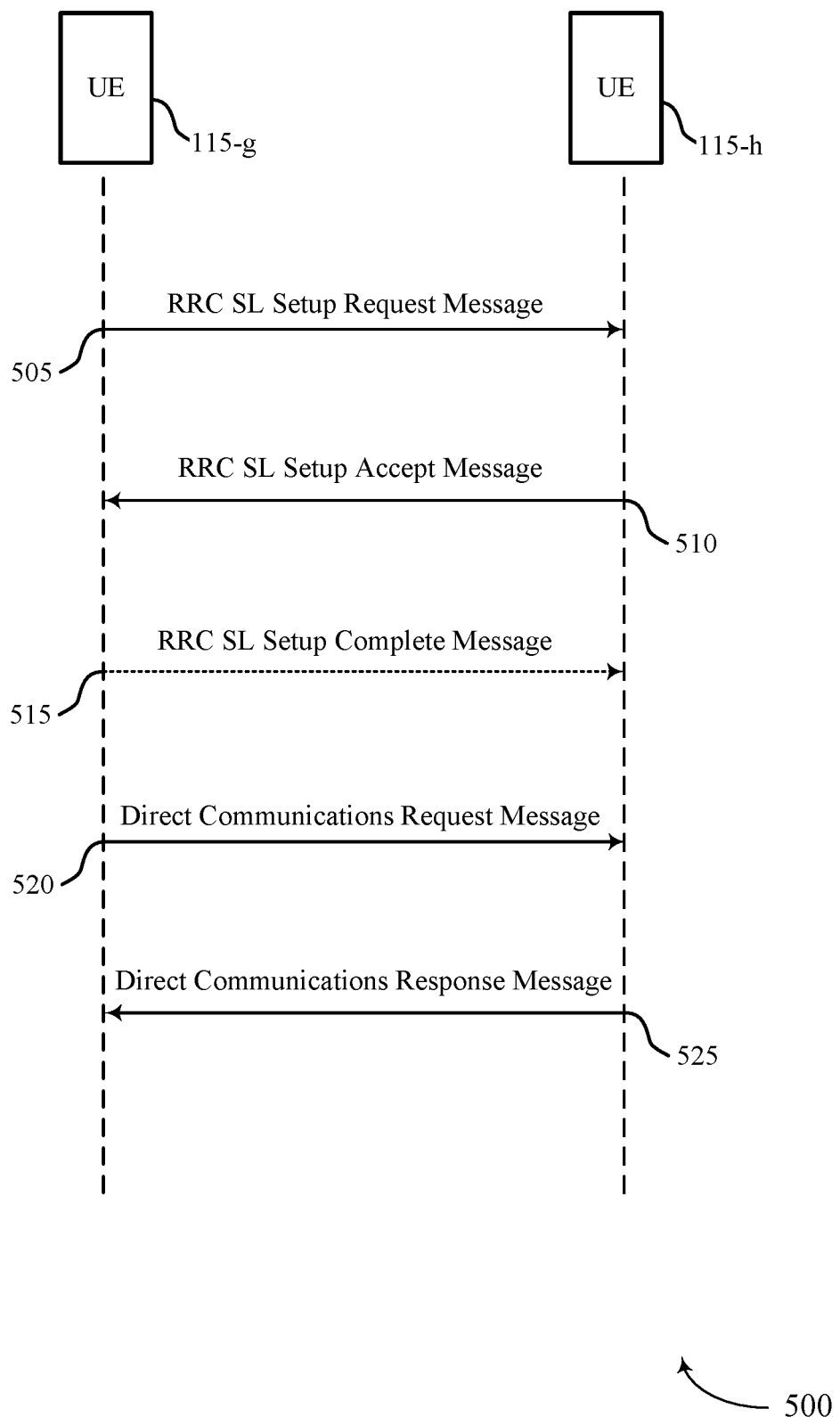

FIG. 5 illustrates an example of a process flow 500 that supports coordinating RRC signaling with upper layer direct link establishment procedures in accordance with one or more aspects of the present disclosure. In some examples, the process flow 500 may implement aspects of the wireless communications systems 100 and 200. The process flow 500 may include a UE 115-*g* and a UE 115-*h* which may be examples of the corresponding devices described with reference to FIGS. 1 and 2. The UE 115-*g* may be referred to as an initiating UE that initiates a layer signaling procedure, and UE 115-*h* may be referred to as a target UE that is targeted for the layer signaling procedure by the initiating UE 115-*g*. The layer signaling procedure may be an RRC layer signaling procedure, a V2X layer signaling procedure, and/or the like.

In the following description of the process flow 500, the operations between the UE 115-*g* and the UE 115-*h* may be transmitted in a different order than the exemplary order shown, or the operations performed by the UE 115-*g* and the UE 115-*h* may be performed in different orders or at different times. Certain operations may also be omitted from the process flow 500, and/or other operations may be added to the process flow 500.

At 505, the UE 115-*g* may transmit an RRC message to the UE 115-*h*. For example, the RRC message may be a connection setup request message (e.g., RRCSLSetupRequest message). The connection setup request message may carry information, such as a UE capability (e.g., an AS layer capability (e.g., AS layer IEs) of the UE 115-*g*), a sidelink bearer configuration, QoS-related parameters, or a Tx profile parameter, or a combination thereof. In some examples, the RRC message may include (e.g., appended or encapsulated) an upper layer signaling message. The upper layer signaling message may be a discovery request message (e.g., a DISCOVER_TARGET_REQ message) to the UE 115-*h*. The UE 115-*g* may transmit the RRC message including the upper layer signaling message (e.g., a DISCOVER_TARGET_REQ message) on a sidelink radio bearer (e.g., SL SRB0). In some examples, the discovery request message may carry information, such as a unicast type, an upper layer identifier of the UE 115-*h*, an upper layer identifier of the UE 115-*g*, or an L2 identifier for the unicast type, or a combination thereof. The RRC message including the upper layer signaling message (e.g., a DISCOVER_TARGET_REQ message) may be transmitted with broadcast (e.g., BCAST) L2 identifier address because the L2 identifier address of the UE 115-*h* may be unknown to the UE 115-*g*.

At 510, the UE 115-*h* may, in return, transmit an RRC message to the UE 115-*g*, such as a connection setup response message (e.g., an RRCSLSetupResp message (e.g., an RRCSLSetupAccept message in the example of FIG. 6)). The connection setup response message may carry information, such as an AS layer capability (e.g., AS layer IEs) of the UE 115-*h*, a sidelink bearer resource configuration response, QoS-related parameters, or a Tx profile parameter, or a combination thereof, in response to the connection setup request message. A V2X layer of the UE 115-*h* may process the upper layer signaling message (e.g., a DISCOVER_TARGET_REQ message) carried in the received RRC message, and create a discovery response message (e.g., a DISCOVER_TARGET_RESP message). The discovery response message may carry information, such as an upper layer identifier of the UE 115-*h*, or an L2 identifier for unicast communications, or a combination thereof. The UE 115-*h* may include the discovery response message, as an upper layer signaling message, in the RRC message. In some examples, the UE 115-*h* may define RRC IEs to replace the upper layer signaling message completely. That is, the RRC IEs may include information carried in the upper layer signaling message. In doing so, the UE 115-*h* may avoid having to append an additional payload to the RRC message. Here, the RRC layer may process the RRC message, and the RRC layer may inform the V2X layer about the connection (e.g., link setup) with information about the link handle, L2 identifier pairs, and optionally IP addresses, etc.

At 515, the UE 115-*g* may, in response, transmit an RRC message to the UE 115-*h*, to indicate that the connection setup is complete, for example, a connection setup complete message (e.g., RRCSLSetupComplete message). In some examples, the operation at 515 may be optional and omitted from the process flow 500. Following the UE 115-*g* and the UE 115-*h* may exchange another RRC handshake to exchange upper layer signaling messages related to direct link setup messages (e.g., one or more PC5-S link setup messages). These messages may be exchanged on a sidelink radio bearer (e.g., SL SRB1).

At 520, the UE 115-*g* may transmit an upper layer signaling message (e.g., an SL Info transfer message) to the UE 115-*h*, which may be a direct communications request message (e.g., a DIRECT_COMM_REQUEST message). The direct communications request message may carry information, such as a unicast type, an upper layer identifier of the UE 115-*h*, an upper layer identifier of the UE 115-*g*, an L2 identifier for the unicast type, an IP address configuration, or a nonce, or a combination thereof. At 525, the UE 115-*h* may transmit an upper layer signaling message (e.g., an SL Info transfer message) to the UE 115-*g*, which may be a direct communications response message (e.g., a DIRECT_COMM_SETUP message). Similarly, the direct communications response message may carry information, such as an upper layer identifier of the UE 115-*h*, an L2 identifier for unicast communications, or an IP address configuration, or a combination thereof. The exchange of the upper layer signaling messages may carry information to facilitate establishing a connection (e.g., a unicast connection, a sidelink connection).

In some examples, the UE 115-*g* and the UE 115-*h* may refrain from defining new RRC messages to include upper layer signaling messages (e.g., an SL Info transfer message to carry PC5-S payload). Instead, the UE 115-*g* and the UE 115-*h* may run PC5-S from V2X layer without using RRC container using a data radio bearer. Any message may be either encapsulated or transported over the data radio bearer. For example, a link update request message (e.g., a LINK_ID_UPDATE_REQ message) and a link update response message (e.g., a LINK_ID_UPDATE_RESP message) may be encapsulated in an RRC message (e.g., an RRCSLReconfig message). Alternatively, PC5-S for direct link setup may be triggered for L2 identifier address change, separate from RRC connection setup procedure.

Therefore aspects of the process flow 500 may provide enhancements to the operation of UEs supporting direct communications such as V2X communications systems, and the like. For example, by enabling UEs to exchange upper layer signaling messages related to direct link setup messages (e.g., one or more PC5-S link setup messages) on established sidelink radio bearer (e.g., SL SRB1), operational characteristics, such as processor utilization and latency related to unicast connection setup and maintaining connection information (e.g., one or more identifiers) may be reduced. Aspects of the process flow 500 may be further advantageous for when neither application layer supports discovery of L2 identifiers, nor independent V2X layer supports discovery L2 identifier procedures.

Figure 6:
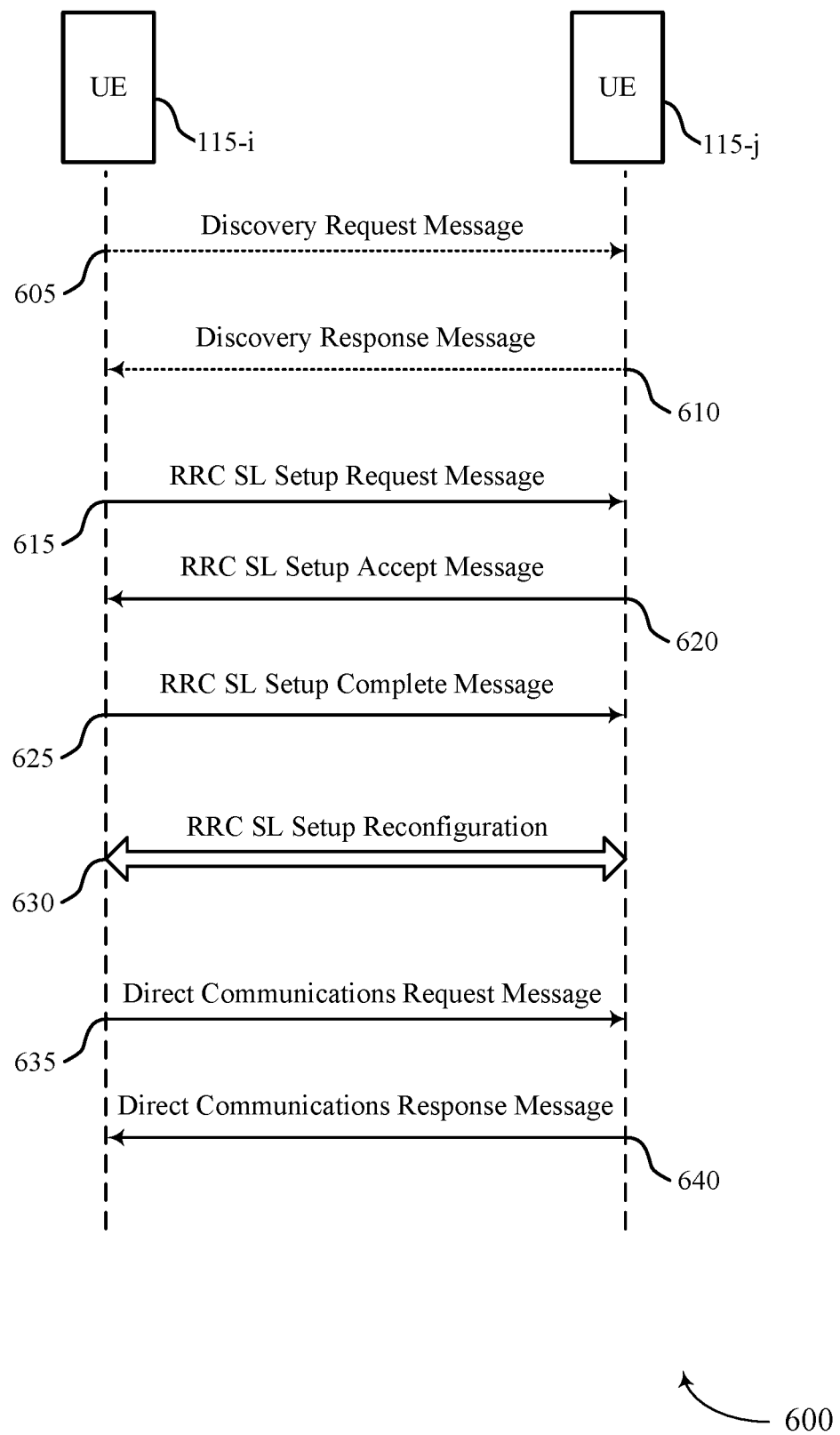

FIG. 6 illustrates an example of a process flow 600 that supports coordinating RRC signaling with upper layer direct link establishment procedures in accordance with one or more aspects of the present disclosure. In some examples, the process flow 600 may implement aspects of the wireless communications systems 100 and 200. The process flow 600 may include a UE 115-*i* and a UE 115-*j* which may be examples of the corresponding devices described with reference to FIGS. 1 and 2. The UE 115-*i* may be referred to as an initiating UE that initiates a layer signaling procedure, and UE 115-*j* may be referred to as a target UE that is targeted for the layer signaling procedure by the initiating UE 115-*i*. The layer signaling procedure may be an RRC layer signaling procedure, a V2X layer signaling procedure, and/or the like.

The process flow 600 may illustrate communicating (e.g., transmitting, transporting, forwarding) one or more upper layer signaling messages (e.g., one or more PC5-S messages) without encapsulation to one or more RRC messages (e.g., one or more PC5-RRC messages), and more specifically the process flow 600 may illustrate communicating PC5-S messages after an RRC connection setup establishes data radio bearers. That is, a V2X layer may trigger an RRC connection setup procedure, and then use the established sidelink data radio bearer to transport V2X layer signaling messages. The process flow 600 may additionally illustrate an initiator UE triggering RRC connection release, if a direct link setup (e.g., a PC5-S direct link setup) is rejected by a target UE. In the following description of the process flow 600, the operations between the UE 115-*i* and the UE 115-*j* may be transmitted in a different order than the exemplary order shown, or the operations performed by the UE 115-*i* and the UE 115-*j* may be performed in different orders or at different times. Certain operations may also be omitted from the process flow 600, and/or other operations may be added to the process flow 600.

At 605, the UE 115-*i* may transmit an upper layer signaling message, such as a discovery request message (e.g., a DISCOVER_TARGET_REQ message) to the UE 115-*j*. The discovery request message may carry information, such as a unicast type, an upper layer identifier of the UE 115-*j*, an upper layer identifier of the UE 115-*i*, or an L2 identifier for the unicast type, or a combination thereof.

At 610, the UE 115-*j* may, in return, transmit an upper layer signaling message, such as a discovery response message (e.g., a DISCOVER_TARGET_RESP message) to the UE 115-*i*. The discovery response message may carry information, such as an upper layer identifier of the UE 115-*j*, or an L2 identifier for unicast communications, or a combination thereof. In some examples, the operations at 605 and at 610 may be optional and omitted from the process flow 600.

At 615, the UE 115-*i* may transmit an RRC message, such as a connection setup request message (e.g., an RRCSLSetupRequest message) to the UE 115-*j*. For example, a V2X layer of the UE 115-*i* may trigger lower layers (e.g., an AS layer) of the UE 115-*i* to initiate a connection setup procedure (e.g., an RRC connection setup procedure). The connection setup request message may carry information, such as a UE capability, a sidelink bearer configuration, QoS-related parameters, or a Tx profile parameter, or a combination thereof.

At 620, the UE 115-*j* may, in return, transmit an RRC message to the UE 115-*i*, such as a connection setup response message (e.g., an RRCSLSetupAccept message). The connection setup response message may carry information, such as an AS layer capability of the UE 115-*j*, a sidelink bearer resource configuration response, QoS-related parameters, or a Tx profile parameter, or a combination thereof. In some examples, the UE 115-*j* may determine whether to accept or reject the connection setup request based in part on the information provided in the connection setup request message. The UE 115-*j* may make this determination based in part on transmission/reception capability, an ability to accommodate a unicast connection over a sidelink, a particular service indicated for the unicast connection, the contents to be transmitted over the unicast connection, or a combination thereof.

At 625, the UE 115-*i* may, in response, transmit an RRC message, to indicate that the connection setup is complete, for example, a connection setup complete message (e.g., an RRCSLSetupComplete message). In some examples, based in part on establishing the connection, one or more data radio bears may also be established, for example, over a sidelink between the UE 115-*i* and the UE 115-*j*. In some examples, if the UE 115-*j* reject the connection setup request, the UE 115-*i* may trigger an RRC connection release (e.g., if PC5-S direct link setup is rejected by the UE 115-*j*). Here, an RRC layer of the UE 115-*j* may activate a backoff mechanism to prevent the UE 115-*j* to retransmit another connection setup request before a period lapses (e.g., a timer specified in RRC to prevent frequently triggering RRC connection setup requests).

At 630, the UE 115-*i* and the UE 115-*j* may perform a connection setup reconfiguration (e.g., an RRCSLSetupReconfiguration message). For example, the UE 115-*i* and the UE 115-*j* may update identifiers across all layers of a protocol stack (e.g., from application layer identifier to L2 identifier) associated with the connection (e.g., a unicast connection, an RRC connection, a sidelink connection) for security and privacy of the connection.

At 635, the UE 115-*i* may transmit an upper layer signaling message, such as a direct communications request message (e.g., a DIRECT_COMM_REQUEST message) to the UE 115-*j*. The direct communications request message may carry information, such as a unicast type, an upper layer identifier of the UE 115-*j*, an upper layer identifier of the UE 115-*i*, an L2 identifier for the unicast type, an IP address configuration, or a nonce, or a combination thereof.

At 640, the UE 115-*j* may transmit an upper layer signaling message, such as a direct communications response message (e.g., a DIRECT_COMM_ACCEPT message) to the UE 115-*i*. Similarly, the direct communications response message may carry information, such as an upper layer identifier of the UE 115-*j*, an L2 identifier for unicast communications, or an IP address configuration, or a combination thereof. The exchange of the upper layer signaling messages between the UE 115-*i* and the UE 115-*j* may carry information to facilitate establishing a connection (e.g., a unicast connection). In some examples, the exchange of the upper layer signaling messages between the UE 115-*i* and the UE 115-*j* may be performed using the established data radio bears between the UE 115-*i* and the UE 115-*j*.

Figure 7:
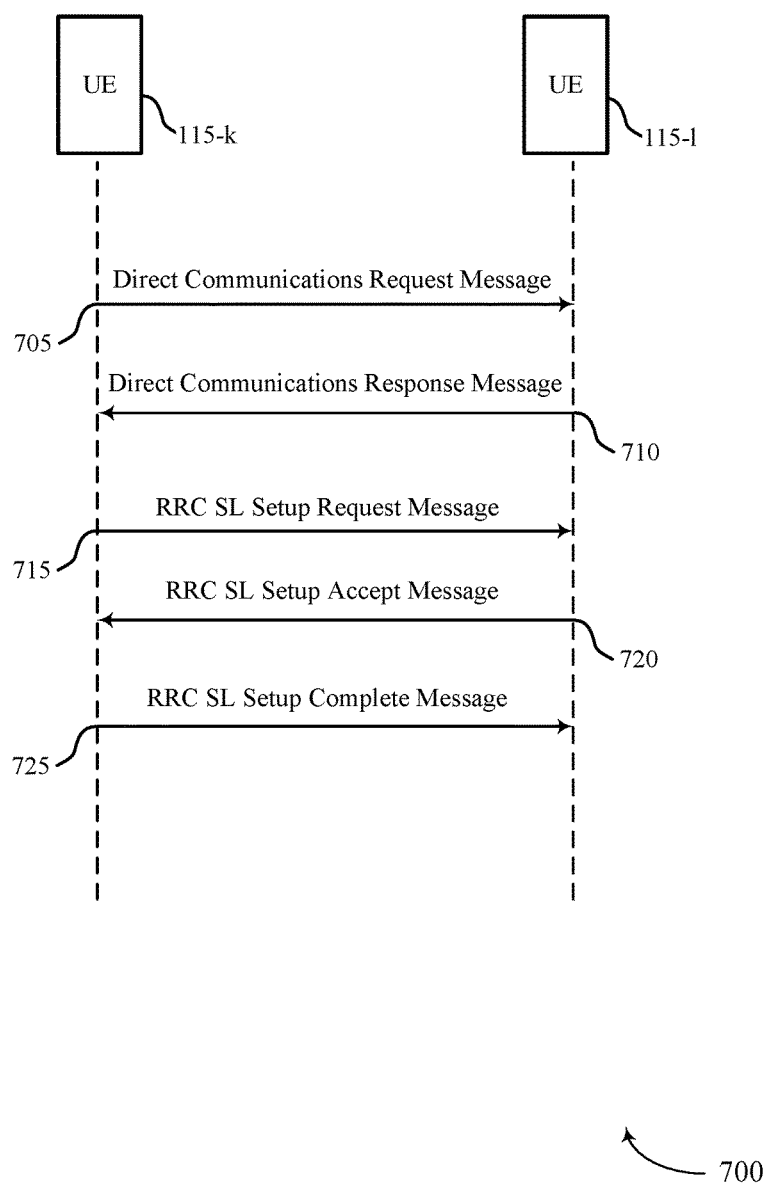

Thus, the process flow 600 may provide enhancements to the operation of UEs supporting direct communications, such as a V2X communications system, and the like. For example, by enabling UEs to exchange upper layer signaling messages (e.g., one or more PC5-S messages) after exchanging PC5-RRC messages, may allow the UEs to use a radio bearer established (during an RRC connection setup procedure) for transporting upper layer signaling messages for direct link connection setup. This in return may benefit the UEs during the direct link connection setup, for example, by reducing overhead signaling FIG. 7 illustrates an example of a process flow 700 that supports coordinating RRC signaling with upper layer direct link establishment procedures in accordance with one or more aspects of the present disclosure. In some examples, the process flow 700 may implement aspects of the wireless communications systems 100 and 200. The process flow 700 may include a UE 115-*k* and a UE 115-1 which may be examples of the corresponding devices described with reference to FIGS. 1 and 2. The UE 115-*k* may be referred to as an initiating UE that initiates a layer signaling procedure, and UE 115-1 may be referred to as a target UE that is targeted for the layer signaling procedure by the initiating UE 115-*k*. The layer signaling procedure may be an RRC layer signaling procedure, a V2X layer signaling procedure, and/or the like.

The process flow 700 may illustrate communicating (e.g., transmitting, transporting, forwarding) one or more upper layer signaling messages (e.g., one or more PC5-S messages) without encapsulation to one or more RRC messages (e.g., one or more PC5-RRC messages), and more specifically the process flow 700 may illustrate communicating PC5-S messages prior to PC5-RRC messages related to RRC connection setup. That is, a direct link setup in V2X layer may be completed, and the V2X layer may then trigger the RRC connection setup procedure to set up an AS connection. In the following description of the process flow 700, the operations between the UE 115-*k* and the UE 115-1 may be transmitted in a different order than the exemplary order shown, or the operations performed by the UE 115-*k* and the UE 115-1 may be performed in different orders or at different times. Certain operations may also be omitted from the process flow 700, and/or other operations may be added to the process flow 700.

At 705, the UE 115-*k* may transmit an upper layer signaling message, such as a direct communications request message (e.g., a DIRECT_COMM_REQUEST message) to the UE 115-1. The direct communications request message may carry information, such as a unicast type, an upper layer identifier of the UE 115-1, an upper layer identifier of the UE 115-*k*, an L2 identifier for the unicast type, an IP address configuration, or a nonce, or a combination thereof.

At 710, the UE 115-1 may transmit an upper layer signaling message, such as a direct communications response message (e.g., a DIRECT_COMM_ACCEPT message) to the UE 115-*k*. Similarly, the direct communications response message may carry information, such as an upper layer identifier of the UE 115-1, an L2 identifier for unicast communications, or an IP address configuration, or a combination thereof. The identifiers may indicate which UE is transmitting which message and/or which UE the message is intended for. The UE 115-*k* and the UE 115-1 may establish a security association (e.g., a security context) for the unicast connection based in part on the information exchanged in the upper layer signaling messages. Thus, the exchange of the upper layer signaling messages between the UE 115-*k* and the UE 115-1 may carry information to facilitate establishing a connection (e.g., a unicast connection). In some examples, the exchange of the upper layer signaling messages between the UE 115-*k* and the UE 115-1 may be performed using a sidelink radio bearer (e.g., SRB1) to transport the upper layer signaling messages.

At 715, the UE 115-*k* may transmit an RRC message to the UE 115-1. For example, after the exchange of the upper layer signaling messages (e.g., after PC5-S is completed), a V2X layer of the UE 115-*k* may trigger lower layers (e.g., an AS layer) of the UE 115-*k* to initiate a connection setup procedure (e.g., an RRC connection setup procedure). Thus, the RRC message may be a connection setup request message (e.g., an RRCSLSetupRequest message). The connection setup request message may carry information, such as a UE capability, a sidelink bearer configuration, QoS-related parameters, or a Tx profile parameter, or a combination thereof.

At 720, the UE 115-1 may, in return, transmit an RRC message to the UE 115-*k*, such as a connection setup response message (e.g., an RRCSLSetupResp message). The connection setup response message may carry information, such as an AS layer capability of the UE 115-1, a sidelink bearer resource configuration response, QoS-related parameters, or a Tx profile parameter, or a combination thereof. At 725, the UE 115-*k* may, in response, transmit an RRC message, to indicate that the connection setup is complete, for example, a connection setup complete message (e.g., an RRCSLSetupComplete message).

Thus, the process flow 700 may provide enhancements to the operation of UEs supporting direct communications, such as a V2X communications system, and the like. For example, by enabling UEs to exchange upper layer signaling messages (e.g., PC5-S messages) without encapsulation to RRC messages (e.g., one or more PC5-RRC messages), prior to exchanging PC5-RRC messages during an RRC connection setup, may allow the UEs to use a security association (e.g., security context), established as part of the upper layer signaling messaging, during the RRC connection setup. This in return may benefit the UEs during the RRC connection setup, for example, by reducing overhead signaling related to establishing the security association.

Figure 8:
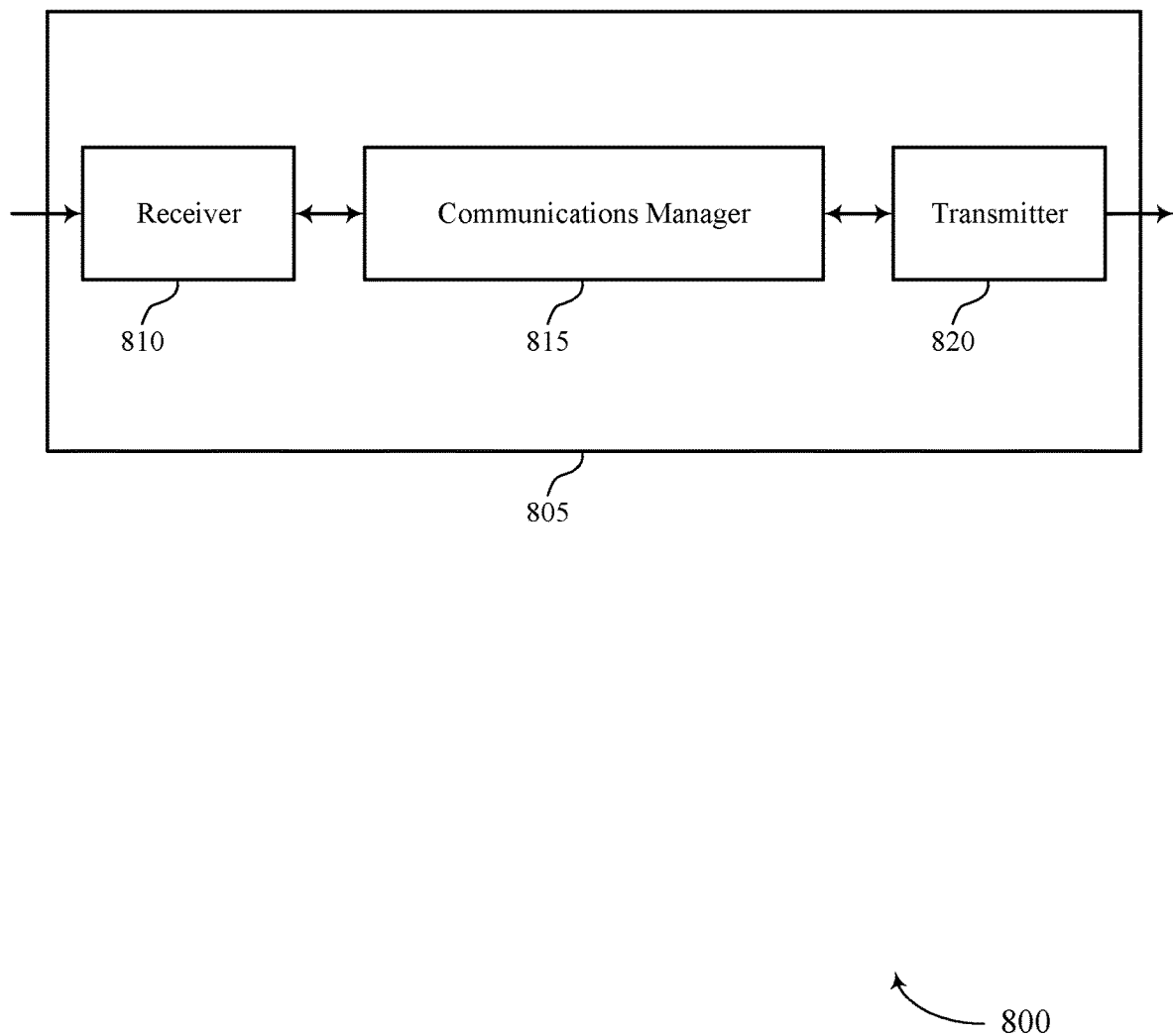
FIGS. 8 and 9 show block diagrams of devices that support coordinating RRC signaling with upper layer direct link establishment procedures in accordance with one or more aspects of the present disclosure.

FIG. 8 shows a block diagram 800 of a device 805 that supports coordinating RRC signaling with upper layer direct link establishment procedures in accordance with one or more aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to coordinating RRC signaling with upper layer direct link establishment procedures). Information may be passed on to other components of the device 805. The receiver 810 may be an example of aspects of the transceiver 1120 described with reference to FIG. 11. The receiver 810 may utilize a single antenna or a set of antennas.

The communications manager 815 may initiate an RRC layer signaling procedure between the UE and a target UE, include an upper layer signaling message in an RRC message based on the RRC layer signaling procedure, and transmit the RRC message including the upper layer signaling message to the target UE. The communications manager 815 may also transmit, via an RRC layer of the UE, an RRC message based on an RRC layer signaling procedure and transmit, via a V2X layer of the UE, an upper layer signaling message to a target UE before or after the RRC layer signaling procedure.

The communications manager 815 may also receive an RRC message including an upper layer signaling message from an initiator UE based on an RRC layer signaling procedure between the UE and the initiator UE, transmit the second RRC message including the second upper layer signaling message to the initiator UE, and include a second upper layer signaling message in a second RRC message based on the receiving. The communications manager 815 may also transmit, via an RRC layer of the UE, an RRC message based on receiving a second RRC message from an initiator UE as part of an RRC layer signaling procedure and transmit, via a V2X layer of the UE, an upper layer signaling message to an initiator UE before or after the RRC layer signaling procedure based on receiving a second upper layer signaling message from the initiator UE. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

The communications manager 815 as described herein may be implemented to realize one or more potential advantages. One implementation may allow the device 805 to more efficiently coordinate communication between devices 805, and more specifically to coordinate connection establishment between one or more devices 805. For example, a device 805 (e.g., an initiating UE) may initiate a layer signaling procedure (e.g., an RRC layer signaling procedure (e.g., an RRC connection setup procedure)) over sidelink communications with another device 805 (e.g., a target UE). A device 805, integrate upper layer signaling with RRC signaling.

Based on implementing the upper layer signaling RRC signaling integration as described herein, a processor of a UE 115 (e.g., controlling the receiver 810, the transmitter 820, or the transceiver 1120 as described with reference to FIG. 11) may decrease signaling overhead, and decrease signaling latency in the connection establishment between one or more UEs 115.

Figure 9:
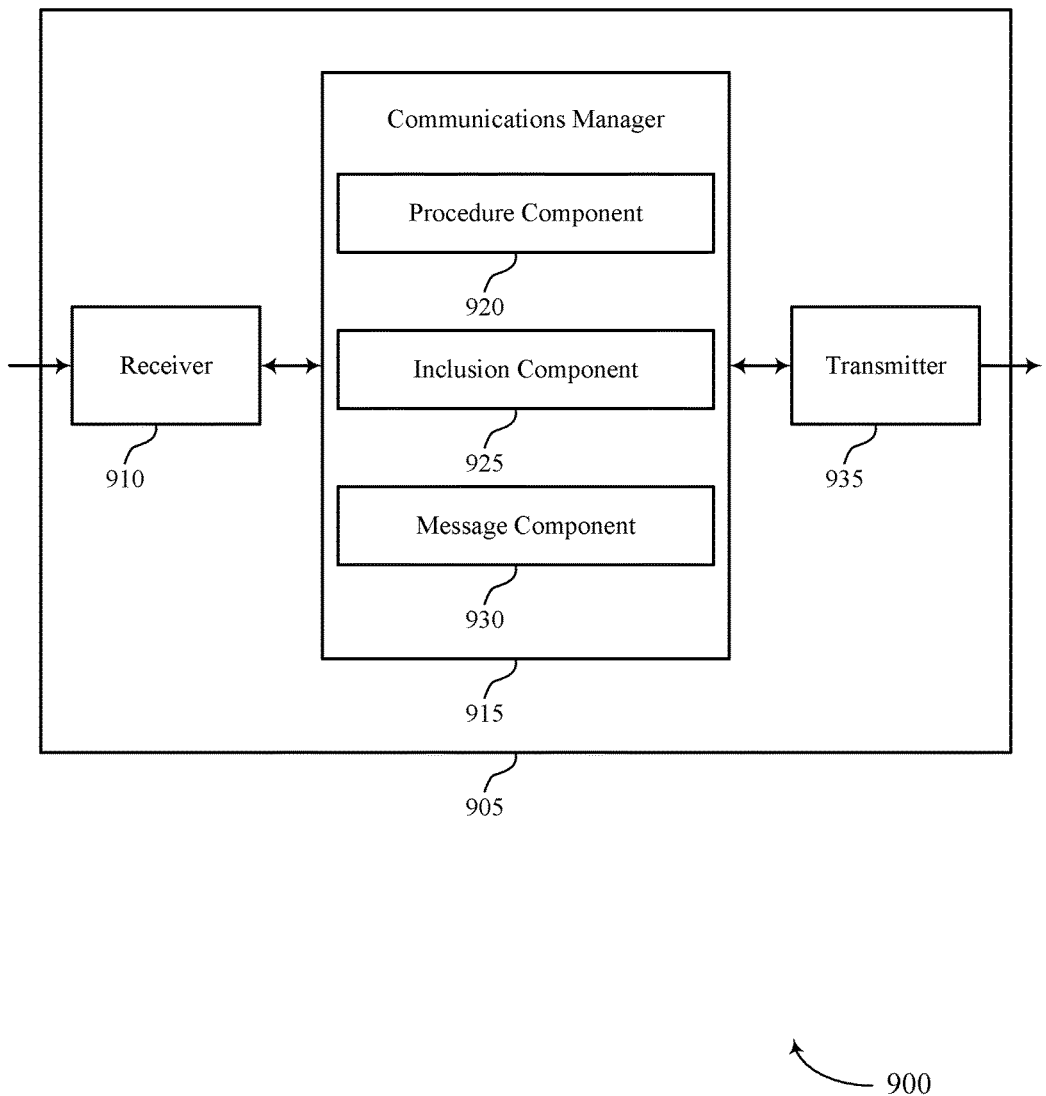

FIG. 9 shows a block diagram 900 of a device 905 that supports coordinating RRC signaling with upper layer direct link establishment procedures in accordance with one or more aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to coordinating RRC signaling with upper layer direct link establishment procedures). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a procedure component 920, an inclusion component 925, and a message component 930. The communications manager 915 may be an example of aspects of the communications manager 1110 described herein.

The procedure component 920 may initiate an RRC layer signaling procedure between the device 905 and a target device. The inclusion component 925 may include an upper layer signaling message in an RRC message based on the RRC layer signaling procedure. The inclusion component 925 may include a second upper layer signaling message in a second RRC message based on the receiving.

The message component 930 may transmit the RRC message including the upper layer signaling message to the target device. The message component 930 may transmit, via an RRC layer of the device 905, an RRC message based on an RRC layer signaling procedure and transmit, via a V2X layer of the device 905, an upper layer signaling message to a target device before or after the RRC layer signaling procedure. The message component 930 may receive an RRC message including an upper layer signaling message from an initiator device based on an RRC layer signaling procedure between the device 905 and the initiator device and transmit the second RRC message including the second upper layer signaling message to the initiator device. The message component 930 may transmit, via an RRC layer of the device 905, an RRC message based on receiving a second RRC message from an initiator device as part of an RRC layer signaling procedure and transmit, via a V2X layer of the device 905, an upper layer signaling message to an initiator device before or after the RRC layer signaling procedure based on receiving a second upper layer signaling message from the initiator device.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
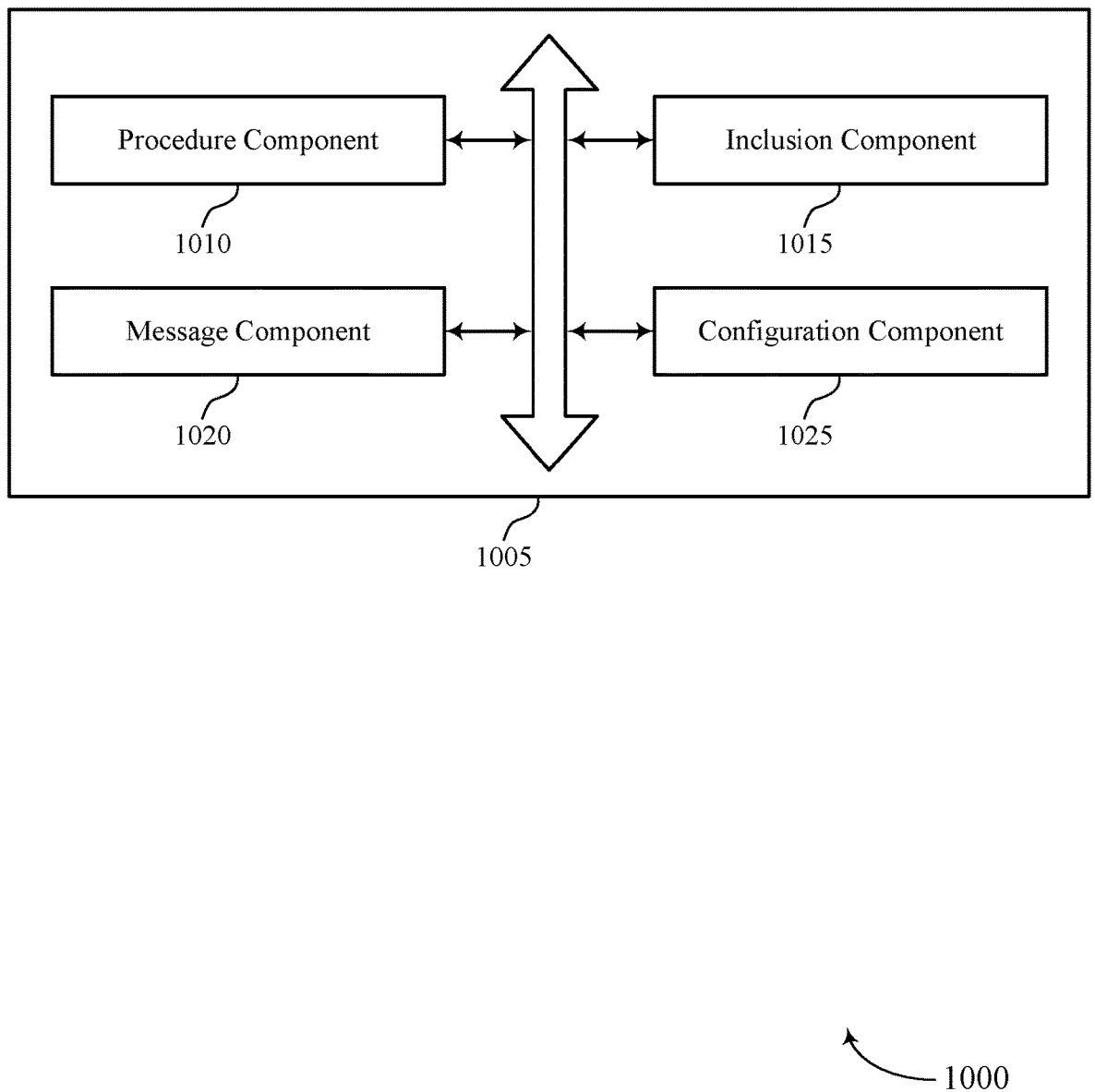
FIG. 10 shows a block diagram of a communications manager that supports coordinating RRC signaling with upper layer direct link establishment procedures in accordance with one or more aspects of the present disclosure.

FIG. 10 shows a block diagram 1000 of a communications manager 1005 that supports coordinating RRC signaling with upper layer direct link establishment procedures in accordance with aspects of the present disclosure. The communications manager 1005 may be an example of aspects of a communications manager 815, a communications manager 915, or a communications manager 1110 described herein. The communications manager 1005 may include a procedure component 1010, an inclusion component 1015, a message component 1020, and a configuration component 1025. Each of these modules may communicate, directly or indirectly, with one another (e.g., via one or more buses).

The procedure component 1010 may initiate an RRC layer signaling procedure between the UE and a target UE. In some cases, the RRC layer signaling procedure includes an RRC connection procedure. The procedure component 1010 may initiate the RRC layer signaling procedure between the UE and the target UE before or after transmitting an upper layer signaling message, where transmitting an RRC message is based on an RRC layer signaling procedure. In some examples, the procedure component 1010 may release the RRC layer signaling procedure based on the connection setup rejection. The procedure component 1010 may perform a second RRC layer signaling procedure between the UE and the target UE based on the releasing and a backoff mechanism, where the backoff mechanism includes a timing delay between releasing the RRC layer signaling procedure and performing the second RRC layer signaling procedure.

The inclusion component 1015 may include an upper layer signaling message in an RRC message based on the RRC layer signaling procedure. In some examples, the inclusion component 1015 may include a second upper layer signaling message in a second RRC message based on the receiving. In some examples, the inclusion component 1015 may append a payload of the upper layer signaling message to a payload of the RRC message. In some examples, the inclusion component 1015 may append a payload of the second upper layer signaling message to a payload of the second RRC message.

The message component 1020 may transmit the RRC message including the upper layer signaling message to the target UE. In some examples, the message component 1020 may transmit, via an RRC layer of the UE, an RRC message based on an RRC layer signaling procedure. The message component 1020 may transmit, via a V2X layer of the UE, an upper layer signaling message to a target UE before or after the RRC layer signaling procedure.

In some examples, the message component 1020 may receive an RRC message including an upper layer signaling message from an initiator UE based on an RRC layer signaling procedure between the UE and the initiator UE. In some examples, the message component 1020 may transmit the second RRC message including the second upper layer signaling message to the initiator UE. The message component 1020 may transmit, via an RRC layer of the UE, an RRC message based on receiving the second RRC message from an initiator UE as part of an RRC layer signaling procedure.

In some examples, the message component 1020 may transmit, via a V2X layer of the UE, an upper layer signaling message to an initiator UE before or after the RRC layer signaling procedure based on receiving a second upper layer signaling message from the initiator UE. In some examples, the message component 1020 may receive, from the target UE, the second RRC message including a second upper layer signaling message based on the transmitting. In some examples, the message component 1020 may transmit, to the target UE, a third RRC message based on receiving the second RRC message from the target UE.

The message component 1020 may transmit, to the target UE, a third upper layer signaling message including a direct communications request, where the direct communications request includes a unicast type, an upper layer identifier of the target UE, an upper layer identifier of the UE, an L2 identifier for the unicast type, an IP address configuration, or a nonce, or a combination thereof. In some examples, message component 1020 may receive, from the target UE, a fourth upper layer signaling message including a direct communications response, where the direct communications response includes an upper layer identifier of the target UE, an L2 identifier for unicast communications, or an IP address configuration, or a combination thereof.

In some examples, the message component 1020 may process, by a V2X layer of the UE, the fourth upper layer signaling message, where receiving the fourth upper layer signaling message is based on the processing.

In some examples, the message component 1020 may receive, from the target UE, a second upper layer signaling message including a discovery response including an upper layer identifier of the target UE, or an L2 identifier for unicast communications, or a combination thereof. In some examples, the message component 1020 may receive, from the target UE, a second upper layer signaling message including a direct communications response including an upper layer identifier of the target UE, an L2 identifier for unicast communications, or an IP address configuration, or a combination thereof. In some examples, the RRC message includes a connection setup request including a UE capability, a sidelink bearer configuration, a QoS parameter, or a Tx profile parameter, or a combination thereof. In some examples, the second RRC message includes a connection setup response including an AS layer capability, a sidelink bearer resource configuration response, a QoS parameter, or a Tx profile parameter, or a combination thereof.

In some examples, the message component 1020 may transmit, to the target UE, a third RRC message based on receiving the second RRC message from the target UE. In some examples, the message component 1020 may receive a second RRC message from the target UE based on the RRC layer signaling procedure, where the second RRC message includes a connection setup rejection. In some examples, the message component 1020 may receive, from the initiator UE, a third upper layer signaling message including a direct communications request, where the direct communications request includes a unicast type, an upper layer identifier of the UE, an upper layer identifier of the initiator UE, an L2 identifier for the unicast type, an IP address configuration, or a nonce, or a combination thereof. In some examples, the message component 1020 may process, by a V2X layer of the UE, the third upper layer signaling message, where receiving the third upper layer signaling message is based on the processing. In some examples, the message component 1020 may transmit, to the initiator UE, a fourth upper layer signaling message including a direct communications response, where the direct communications response includes an upper layer identifier of the UE, an L2 identifier for unicast communications, or an IP address configuration, or a combination thereof.

In some cases, the RRC message includes a request (e.g., a connection setup request) including a UE capability, a sidelink bearer configuration, a QoS parameter, or a Tx profile parameter, or a combination thereof. In some cases, the upper layer signaling message includes a direct communications request including a unicast type, an upper layer identifier of the target UE, an upper layer identifier of the UE, an L2 identifier for the unicast type, an IP address configuration, or a nonce, or a combination thereof. In some cases, the second RRC message includes a connection setup response including an AS layer capability, a sidelink bearer resource configuration response, a QoS parameter, or a Tx profile parameter, or a combination thereof. In some cases, the second upper layer signaling message includes a direct communications response including an upper layer identifier of the target UE, an L2 identifier for unicast communications, or an IP address configuration, or a combination thereof. In some cases, the second RRC message includes a connection setup rejection. In some cases, the second upper layer signaling message associated with the connection setup rejection includes a failure cause indication. In some cases, the upper layer signaling message includes a request (e.g., a discovery request) including a unicast type, an upper layer identifier of the target UE, an upper layer identifier of the UE, or an L2 identifier for the unicast type, or a combination thereof. In some cases, the second upper layer signaling message includes a discovery response including an upper layer identifier of the target UE, or an L2 identifier for unicast communications, or a combination thereof.

The configuration component 1025 may select a set of RRC IEs of the RRC message. In some examples, the configuration component 1025 may assign the set of RRC IEs to the upper layer signaling message. In some examples, the assigned set of RRC IEs carry information of the upper layer signaling message. In some examples, the configuration component 1025 may process, by an RRC layer of the UE, the RRC message including the assigned set of RRC IEs carrying the information of the upper layer signaling message.

In some examples, the configuration component 1025 may select a set of RRC IEs of the second RRC message. In some examples, the configuration component 1025 may assign the set of RRC IEs to the second upper layer signaling message. In some examples, the assigned set of RRC IEs carry information of the second upper layer signaling message. In some examples, the configuration component 1025 may process, by an RRC layer of the UE, the second RRC message including the assigned set of RRC IEs carrying the information of the second upper layer signaling message.

Figure 11:
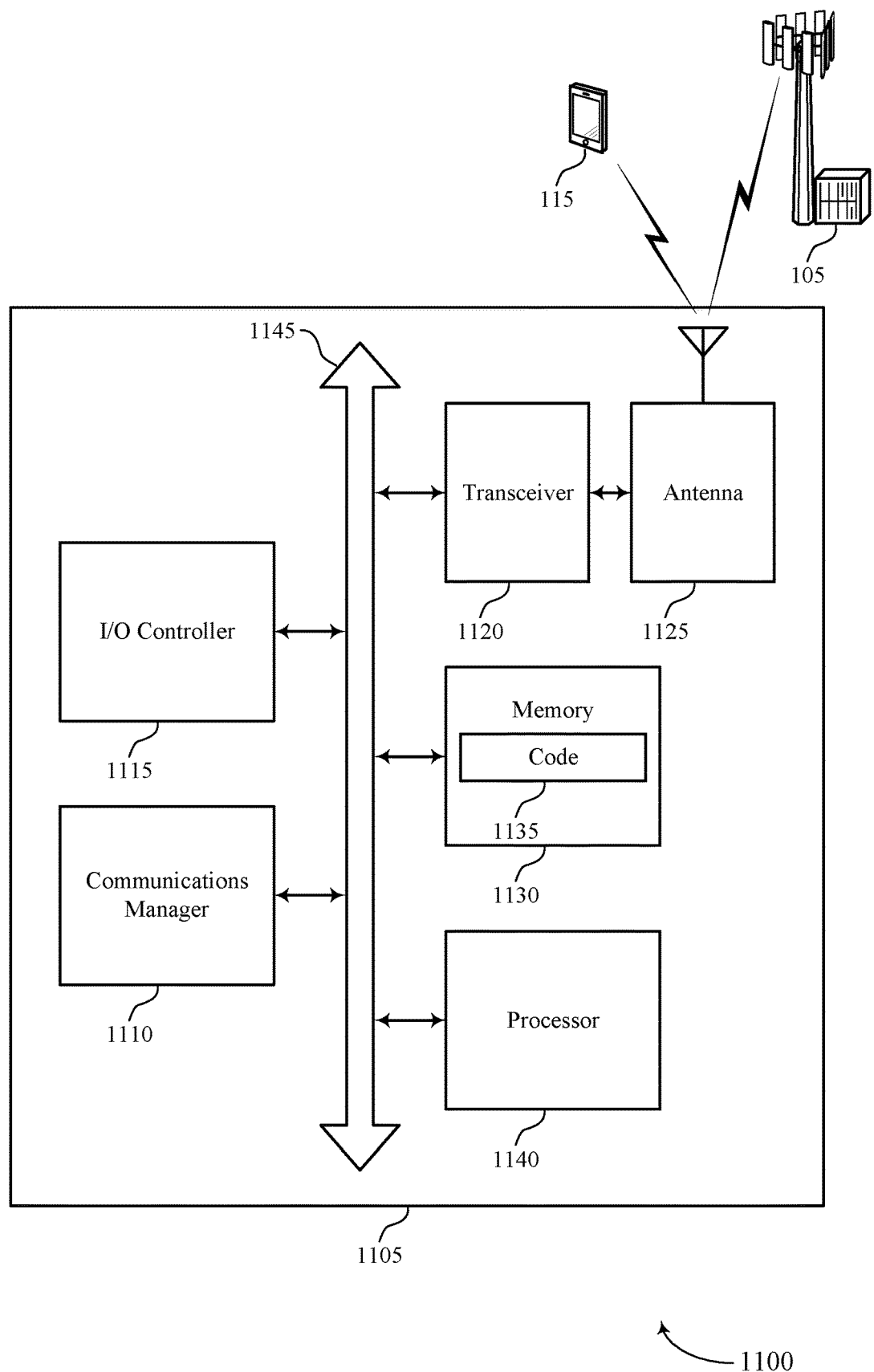
FIG. 11 shows a diagram of a system including a device that supports coordinating RRC signaling with upper layer direct link establishment procedures in accordance with one or more aspects of the present disclosure.

FIG. 11 shows a diagram of a system 1100 including a device 1105 that supports coordinating RRC signaling with upper layer direct link establishment procedures in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may initiate an RRC layer signaling procedure between the device 1105 and a target UE, include an upper layer signaling message in an RRC message based on the RRC layer signaling procedure, and transmit the RRC message including the upper layer signaling message to the target UE. The communications manager 1110 may also transmit, via an RRC layer of the device 1105, an RRC message based on an RRC layer signaling procedure and transmit, via a V2X layer of the device 1105, an upper layer signaling message to a target UE before or after the RRC layer signaling procedure.

The communications manager 1110 may also receive an RRC message including an upper layer signaling message from an initiator UE based on an RRC layer signaling procedure between the device 1105 and the initiator UE, transmit the second RRC message including the second upper layer signaling message to the initiator UE, and include a second upper layer signaling message in a second RRC message based on the receiving. The communications manager 1110 may also transmit, via an RRC layer of the device 1105, an RRC message based on receiving a second RRC message from an initiator UE as part of an RRC layer signaling procedure and transmit, via a V2X layer of the device 1105, an upper layer signaling message to an initiator UE before or after the RRC layer signaling procedure based on receiving a second upper layer signaling message from the initiator UE.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS, ANDROID, MS-DOS, MS-WINDOWS, OS/2, UNIX, LINUX, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases the device 1105 may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting coordinating RRC signaling with upper layer direct link establishment procedures).

Figure 12:
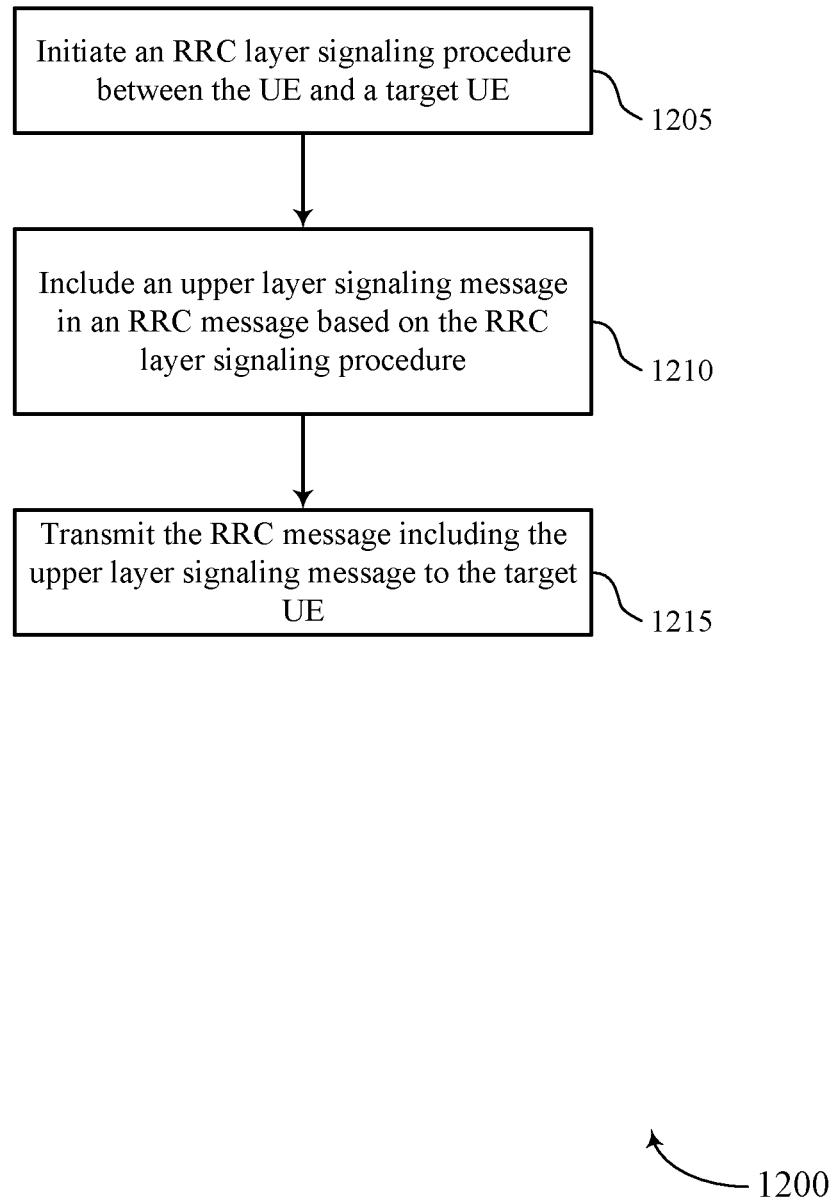
FIGS. 12 through 15 show flowcharts illustrating methods that support coordinating RRC signaling with upper layer direct link establishment procedures in accordance with one or more aspects of the present disclosure.

FIG. 12 shows a flowchart illustrating a method 1200 that supports coordinating RRC signaling with upper layer direct link establishment procedures in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1205, the UE may initiate an RRC layer signaling procedure between the UE and a target UE. The operations of 1205 may be performed according to the methods described herein. In some examples, aspects of the operations of 1205 may be performed by a procedure component as described with reference to FIGS. 8 through 11.

At 1210, the UE may include an upper layer signaling message in an RRC message based on the RRC layer signaling procedure. The operations of 1210 may be performed according to the methods described herein. In some examples, aspects of the operations of 1210 may be performed by an inclusion component as described with reference to FIGS. 8 through 11.

At 1215, the UE may transmit the RRC message including the upper layer signaling message to the target UE. The operations of 1215 may be performed according to the methods described herein. In some examples, aspects of the operations of 1215 may be performed by a message component as described with reference to FIGS. 8 through 11.

Figure 13:
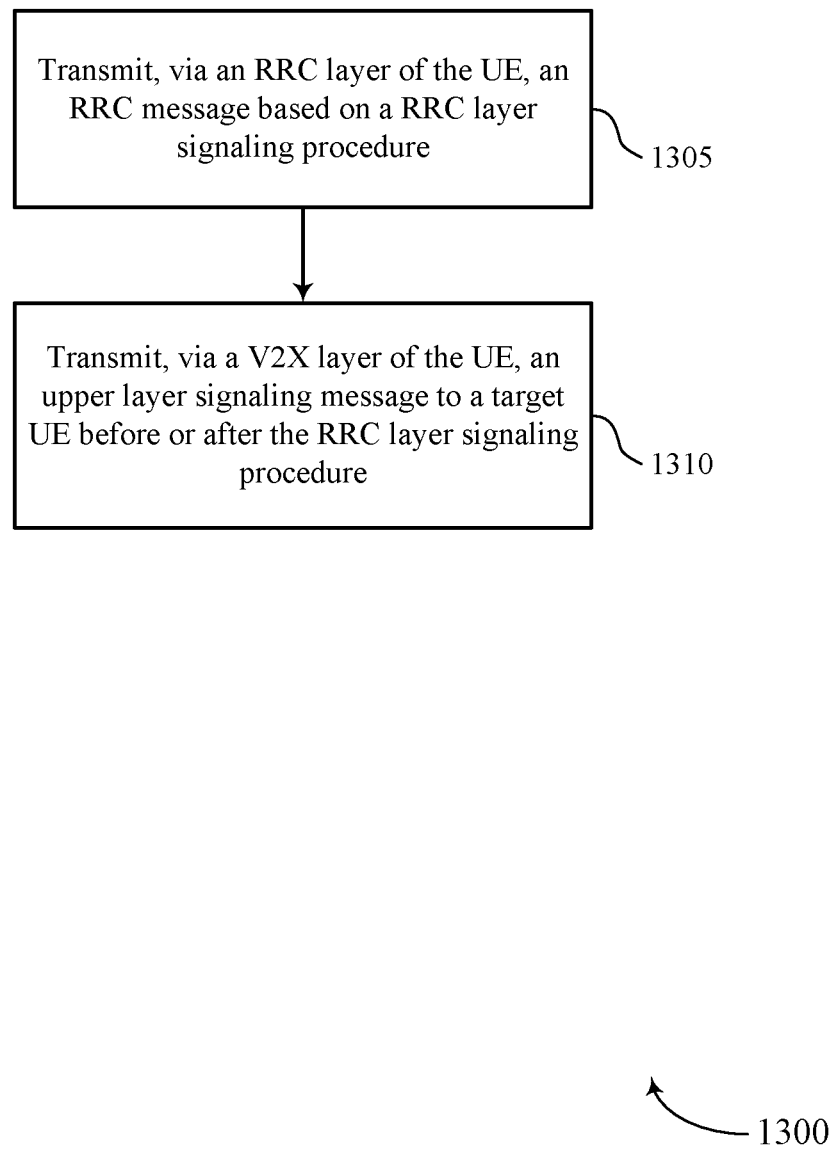

FIG. 13 shows a flowchart illustrating a method 1300 that supports coordinating RRC signaling with upper layer direct link establishment procedures in accordance with aspects of the present disclosure. The operations of method 1300 may be implemented by a UE 115 or its components as described herein. For example, the operations of method 1300 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1305, the UE may transmit, via an RRC layer of the UE, an RRC message based on an RRC layer signaling procedure. The operations of 1305 may be performed according to the methods described herein. In some examples, aspects of the operations of 1305 may be performed by a message component as described with reference to FIGS. 8 through 11.

At 1310, the UE may transmit, via a V2X layer of the UE, an upper layer signaling message to a target UE before or after the RRC layer signaling procedure. The operations of 1310 may be performed according to the methods described herein. In some examples, aspects of the operations of 1310 may be performed by a message component as described with reference to FIGS. 8 through 11.

Figure 14:
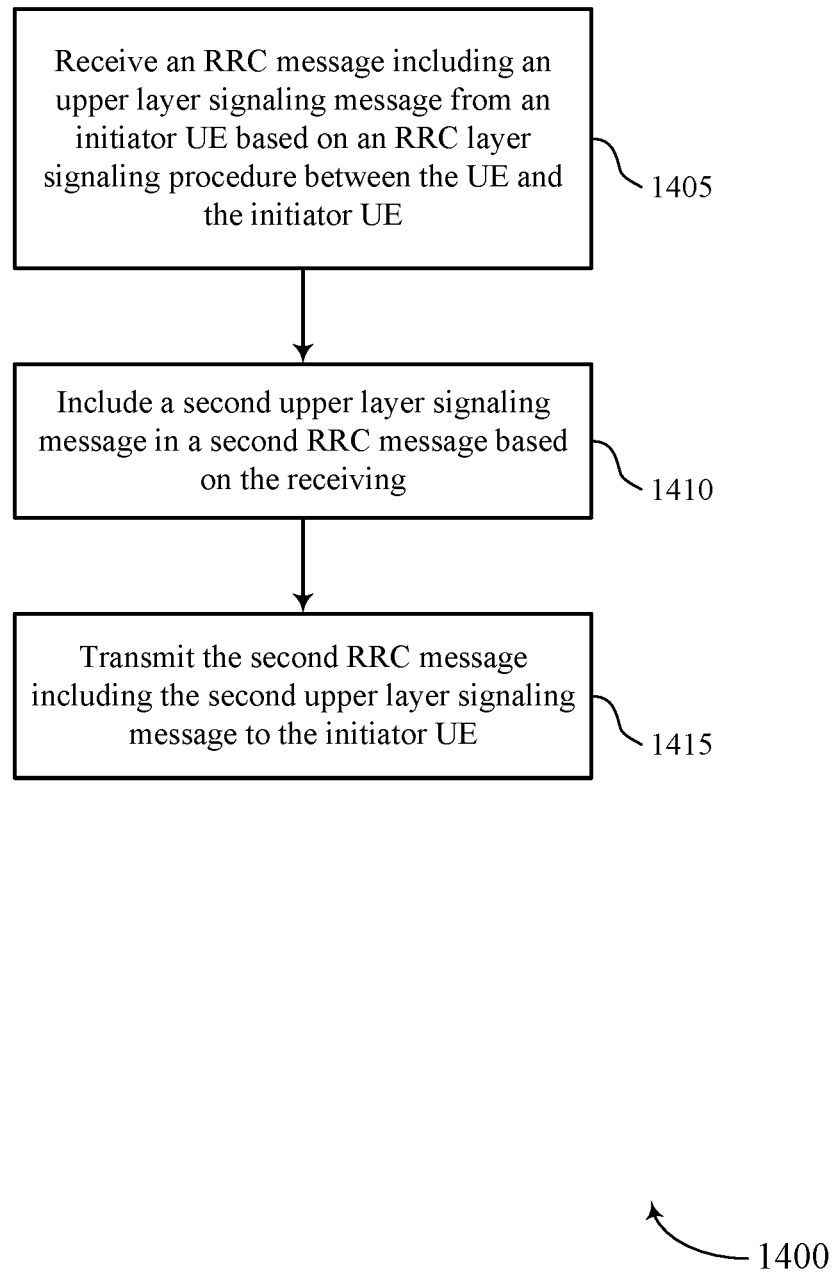

FIG. 14 shows a flowchart illustrating a method 1400 that supports coordinating RRC signaling with upper layer direct link establishment procedures in accordance with aspects of the present disclosure. The operations of method 1400 may be implemented by a UE 115 or its components as described herein. For example, the operations of method 1400 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1405, the UE may receive an RRC message including an upper layer signaling message from an initiator UE based on an RRC layer signaling procedure between the UE and the initiator UE. The operations of 1405 may be performed according to the methods described herein. In some examples, aspects of the operations of 1405 may be performed by a message component as described with reference to FIGS. 8 through 11.

At 1410, the UE may include a second upper layer signaling message in a second RRC message based on the receiving. The operations of 1410 may be performed according to the methods described herein. In some examples, aspects of the operations of 1410 may be performed by an inclusion component as described with reference to FIGS. 8 through 11.

At 1415, the UE may transmit the second RRC message including the second upper layer signaling message to the initiator UE. The operations of 1415 may be performed according to the methods described herein. In some examples, aspects of the operations of 1415 may be performed by a message component as described with reference to FIGS. 8 through 11.

Figure 15:
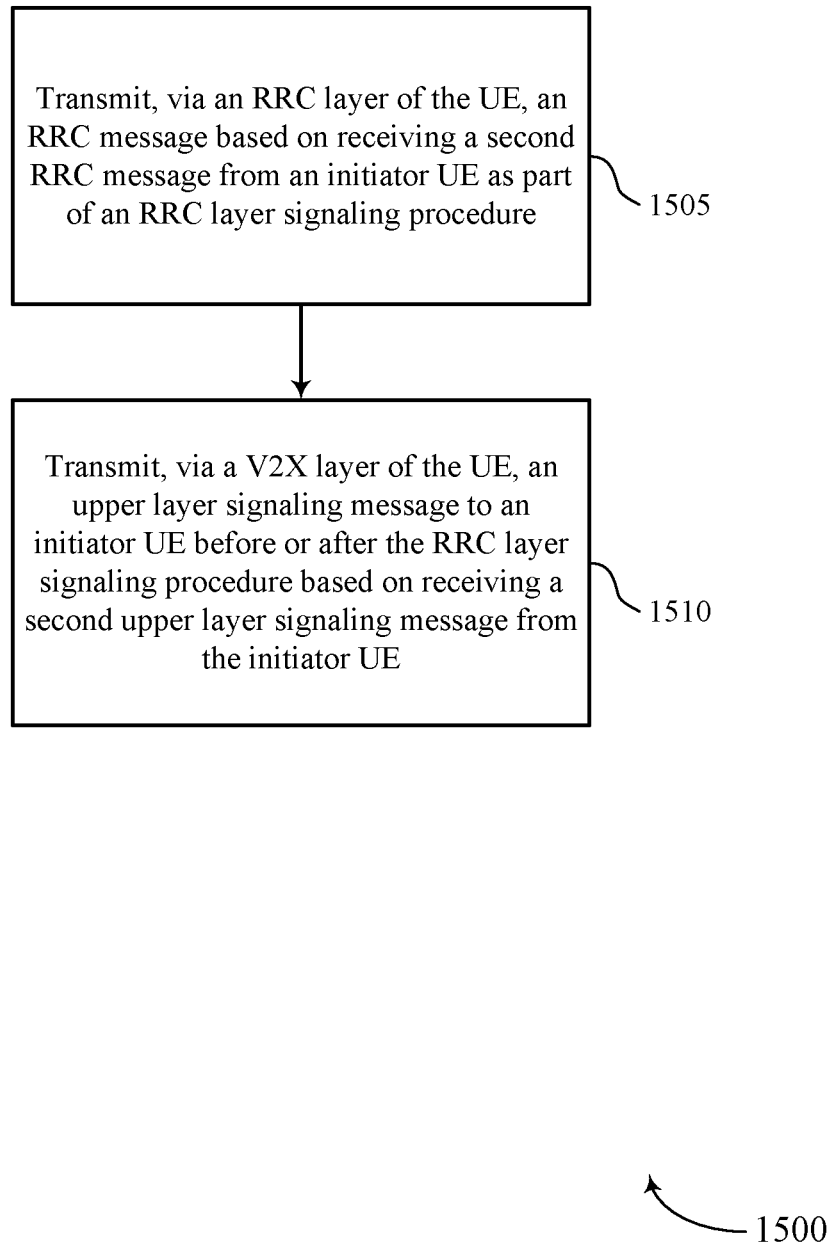

FIG. 15 shows a flowchart illustrating a method 1500 that supports coordinating RRC signaling with upper layer direct link establishment procedures in accordance with aspects of the present disclosure. The operations of method 1500 may be implemented by a UE 115 or its components as described herein. For example, the operations of method 1500 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1505, the UE may transmit, via an RRC layer of the UE, an RRC message based on receiving a second RRC message from an initiator UE as part of an RRC layer signaling procedure. The operations of 1505 may be performed according to the methods described herein. In some examples, aspects of the operations of 1505 may be performed by a message component as described with reference to FIGS. 8 through 11.

At 1510, the UE may transmit, via a V2X layer of the UE, an upper layer signaling message to an initiator UE before or after the RRC layer signaling procedure based on receiving a second upper layer signaling message from the initiator UE. The operations of 1510 may be performed according to the methods described herein. In some examples, aspects of the operations of 1510 may be performed by a message component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Example 1

A method for wireless communications at a UE, comprising: transmitting, via an RRC layer of the UE, an RRC message based at least in part on an RRC layer signaling procedure; and transmitting, via a V2X layer of the UE, an upper layer signaling message to a target UE before the RRC layer signaling procedure.

Example 2

The method of example 1, wherein the RRC layer signaling procedure comprises an RRC connection procedure.

Example 3

The method of any of examples 1 or 2, wherein the upper layer signaling message comprises a request comprising a unicast type, an upper layer identifier of the target UE, an upper layer identifier of the UE, or an L2 identifier for the unicast type, or a combination thereof.

Example 4

The method of example 3, further comprising: receiving, from the target UE, a second upper layer signaling message comprising a response comprising an upper layer identifier of the target UE, or an L2 identifier for unicast communications, or a combination thereof.

Example 5

The method of any of examples 3 or 4, further comprising: receiving, from the target UE, a second upper layer signaling message comprising a direct communications response comprising an upper layer identifier of the target UE, an L2 identifier for unicast communications, or an IP address configuration, or a combination thereof.

Example 6

The method of any examples 3 to 5, further comprising: initiating the RRC layer signaling procedure between the UE and a target UE after transmitting the upper layer signaling message, wherein transmitting the RRC message is based at least in part on the RRC layer signaling procedure, wherein the RRC message comprises a request comprising a UE capability, a sidelink bearer configuration, a QoS parameter, or a Tx profile parameter, or a combination thereof.

Example 7

The method of example 6, further comprising: receiving a second RRC message from the target UE based at least in part on the RRC layer signaling procedure, wherein the second RRC message comprises a response comprising an AS layer capability, a sidelink bearer resource configuration response, a QoS parameter, or a Tx profile parameter, or a combination thereof; and transmitting, to the target UE, a third RRC message based at least in part on receiving the second RRC message from the target UE.

Example 8

The method of any of examples 6 or 7, further comprising: receiving a second RRC message from the target UE based at least in part on the RRC layer signaling procedure, wherein the second RRC message comprises a connection setup rejection; and releasing the RRC layer signaling procedure based at least in part on the connection setup rejection.

Example 9

The method of example 8, further comprising: performing a second RRC layer signaling procedure between the UE and a target UE based at least in part on the releasing and a backoff mechanism, wherein the backoff mechanism comprises a timing delay between releasing the RRC layer signaling procedure and performing the second RRC layer signaling procedure.

Example 10

The method of any of examples 1 to 8, wherein the upper layer signaling message comprises a direct communications request comprising a unicast type, an upper layer identifier of the target UE, an upper layer identifier of the UE, an L2 identifier for the unicast type, an IP address configuration, or a nonce, or a combination thereof.

Example 11

The method of any of examples 1 to 9, wherein the V2X layer signals the RRC layer to initiate the RRC layer signaling procedure.

Example 12

An apparatus comprising at least one means for performing a method of any of examples 1 to 11.

Example 13

An apparatus for wireless communications comprising a processor; and memory coupled to the processor, the processor and memory configured to perform a method of any of examples 1 to 11.

Example 14

A non-transitory computer-readable medium storing code for wireless communications, the code comprising instructions executable by a processor to perform a method of any of examples 1 to 11.

Example 15

A method for wireless communications at a UE, comprising: transmitting, via an RRC layer of the UE, an RRC message based at least in part on an RRC layer signaling procedure; and transmitting, via a V2X layer of the UE, an upper layer signaling message to a target UE after the RRC layer signaling procedure.

Example 16

The method of example 15, wherein the RRC layer signaling procedure comprises an RRC connection procedure.

Example 17

The method of any of examples 15 or 17, wherein the upper layer signaling message comprises a request comprising a unicast type, an upper layer identifier of the target UE, an upper layer identifier of the UE, or an L2 identifier for the unicast type, or a combination thereof.

Example 18

The method of example 17, further comprising: receiving, from the target UE, a second upper layer signaling message comprising a response comprising an upper layer identifier of the target UE, or an L2 identifier for unicast communications, or a combination thereof.

Example 19

The method of any of examples 17 or 18, further comprising: receiving, from the target UE, a second upper layer signaling message comprising a direct communications response comprising an upper layer identifier of the target UE, an L2 identifier for unicast communications, or an IP address configuration, or a combination thereof.

Example 20

The method of any examples 17 to 19, further comprising: initiating the RRC layer signaling procedure between the UE and a target UE before transmitting the upper layer signaling message, wherein transmitting the RRC message is based at least in part on the RRC layer signaling procedure, wherein the RRC message comprises a request comprising a UE capability, a sidelink bearer configuration, a QoS parameter, or a Tx profile parameter, or a combination thereof.

Example 21

The method of example 20, further comprising: receiving a second RRC message from the target UE based at least in part on the RRC layer signaling procedure, wherein the second RRC message comprises a response comprising an AS layer capability, a sidelink bearer resource configuration response, a QoS parameter, or a Tx profile parameter, or a combination thereof; and transmitting, to the target UE, a third RRC message based at least in part on receiving the second RRC message from the target UE.

Example 22

The method of any of examples 20 or 21, further comprising: receiving a second RRC message from the target UE based at least in part on the RRC layer signaling procedure, wherein the second RRC message comprises a connection setup rejection; and releasing the RRC layer signaling procedure based at least in part on the connection setup rejection.

Example 23

The method of example 22, further comprising: performing a second RRC layer signaling procedure between the UE and a target UE based at least in part on the releasing and a backoff mechanism, wherein the backoff mechanism comprises a timing delay between releasing the RRC layer signaling procedure and performing the second RRC layer signaling procedure.

Example 24

The method of any of examples 15 to 23, wherein the upper layer signaling message comprises a direct communications request comprising a unicast type, an upper layer identifier of the target UE, an upper layer identifier of the UE, an L2 identifier for the unicast type, an IP address configuration, or a nonce, or a combination thereof.

Example 25

The method of any of examples 15 to 24, wherein the V2X layer signals the RRC layer to initiate the RRC layer signaling procedure.

Example 26

An apparatus comprising at least one means for performing a method of any of examples 15 to 25.

Example 27

An apparatus for wireless communications comprising a processor; and memory coupled to the processor, the processor and memory configured to perform a method of any of examples 15 to 25.

Example 28

A non-transitory computer-readable medium storing code for wireless communications, the code comprising instructions executable by a processor to perform a method of any of examples 15 to 25.

Example 29

A method for wireless communications at a UE, comprising: initiating an RRC layer signaling procedure between the UE and a target UE; including an upper layer signaling message in an RRC message based at least in part on the RRC layer signaling procedure; and transmitting the RRC message comprising the upper layer signaling message to the target UE.

Example 30

The method of example 29, wherein the RRC layer signaling procedure comprises an RRC connection procedure.

Example 31

The method of any of examples 29 or 30, wherein including the upper layer signaling message in the RRC message comprises: appending a payload of the upper layer signaling message to a payload of the RRC message.

Example 32

The method of any of examples 29 to 31, wherein the RRC message comprises a connection setup request comprising a UE capability, a sidelink bearer configuration, a QoS parameter, or a Tx profile parameter, or a combination thereof.

Example 33

The method of any of examples 29 to 32, wherein the upper layer signaling message comprises a direct communications request comprising a unicast type, an upper layer identifier of the target UE, an upper layer identifier of the UE, an L2 identifier for the unicast type, an IP address configuration, or a nonce, or a combination thereof.

Example 34

The method of any of examples 29 to 33, further comprising: receiving, from the target UE, a second RRC message comprising a second upper layer signaling message based at least in part on the transmitting; and transmitting, to the target UE, a third RRC message based at least in part on receiving the second RRC message from the target UE.

Example 35

The method of example 34, wherein the second RRC message comprises a connection setup response comprising an AS layer capability, a sidelink bearer resource configuration response, a QoS parameter, or a Tx profile parameter, or a combination thereof.

Example 36

The method of any of examples 34 or 35, wherein the second upper layer signaling message comprises a direct communications response comprising an upper layer identifier of the target UE, an L2 identifier for unicast communications, or an IP address configuration, or a combination thereof.

Example 37

The method of any of examples 34 to 36, wherein the second RRC message comprises a connection setup rejection.

Example 38

The method of example 37, wherein the second upper layer signaling message associated with the connection setup rejection comprises a failure cause indication.

Example 39

The method of any of examples 29 to 38, wherein the upper layer signaling message comprises a discovery request comprising a unicast type, an upper layer identifier of the target UE, an upper layer identifier of the UE, or an L2 identifier for the unicast type, or a combination thereof.

Example 40

The method of example 39, further comprising: receiving, from the target UE, a second RRC message comprising a second upper layer signaling message based at least in part on the transmitting; and transmitting, to the target UE, a third RRC message based at least in part on receiving the second RRC message from the target UE.

Example 41

The method of example 40, wherein the second RRC message comprises a connection setup response comprising an AS layer capability, a sidelink bearer resource configuration response, a QoS parameter, or a Tx profile parameter, or a combination thereof.

Example 42

The method of any of examples 40 or 41, wherein the second upper layer signaling message comprises a discovery response comprising an upper layer identifier of the target UE, or an L2 identifier for unicast communications, or a combination thereof.

Example 43

The method of any of examples 40 to 42, further comprising: transmitting, to the target UE, a third upper layer signaling message comprising a direct communications request, wherein the direct communications request comprises a unicast type, an upper layer identifier of the target UE, an upper layer identifier of the UE, an L2 identifier for the unicast type, an IP address configuration, or a nonce, or a combination thereof and receiving, from the target UE, a fourth upper layer signaling message comprising a direct communications response, wherein the direct communications response comprises an upper layer identifier of the target UE, an L2 identifier for unicast communications, or an IP address configuration, or a combination thereof.

Example 44

The method of example 43, further comprising: processing, by a V2X layer of the UE, the fourth upper layer signaling message, wherein receiving the fourth upper layer signaling message is based at least in part on the processing.

Example 45

The method of any of examples 29 to 44, further comprising: selecting a set of RRC information elements of the RRC message; and assigning the set of RRC information elements to the upper layer signaling message, wherein the assigned set of RRC information elements carry information of the upper layer signaling message.

Example 46

The method of example 45, further comprising: processing, by an RRC layer of the UE, the RRC message comprising the assigned set of RRC information elements carrying the information of the upper layer signaling message, wherein processing, by the RRC layer of the UE, the RRC message comprises; and transmitting, to a V2X layer, an indication of the RRC layer signaling procedure and the information carried in the upper layer signaling message.

Example 47

An apparatus comprising at least one means for performing a method of any of examples 29 to 46.

Example 48

An apparatus for wireless communications comprising a processor; and memory coupled to the processor, the processor and memory configured to perform a method of any of examples 29 to 46.

Example 49

A non-transitory computer-readable medium storing code for wireless communications, the code comprising instructions executable by a processor to perform a method of any of examples 29 to 46.

Example 50

A method for wireless communications at a UE, comprising: receiving an RRC message comprising an upper layer signaling message from an initiator UE based at least in part on an RRC layer signaling procedure between the UE and the initiator UE; including a second upper layer signaling message in a second RRC message based at least in part on the receiving; and transmitting the second RRC message comprising the second upper layer signaling message to the initiator UE.

Example 51

The method of example 50, wherein including the second upper layer signaling message in the second RRC message comprises: appending a payload of the second upper layer signaling message to a payload of the second RRC message.

Example 52

The method of any of examples 50 or 51, wherein the RRC message comprises a connection setup request comprising a UE capability, a sidelink bearer configuration, a QoS parameter, or a Tx profile parameter, or a combination thereof.

Example 53

The method of any of examples 50 to 52, the upper layer signaling message comprises a direct communications request comprising a unicast type, an upper layer identifier of the UE, an upper layer identifier of the initiator UE, an L2 identifier for the unicast type, an IP address configuration, or a nonce, or a combination thereof.

Example 54

The method of any of examples 50 to 53, wherein the second RRC message comprises a connection setup response comprising an AS layer capability, a sidelink bearer resource configuration response, a QoS parameter, or a Tx profile parameter, or a combination thereof.

Example 55

The method of any of any of examples 50 to 54, wherein the second upper layer signaling message comprises a direct communications response comprising an upper layer identifier of the UE, an L2 identifier for unicast communications, or an IP address configuration, or a combination thereof.

Example 56

The method of any of examples 50 to 55, wherein the upper layer signaling message comprises a discovery request comprising a unicast type, an upper layer identifier of the UE, an upper layer identifier of the initiator UE, or an L2 identifier for the unicast type, or a combination thereof.

Example 57

The method of any of examples 50 to 56, wherein the second upper layer signaling message comprises a discovery response comprising an upper layer identifier of the UE, or an L2 identifier for unicast communications, or a combination thereof.

Example 58

The method of any of 50 to 57, further comprising: receiving, from the initiator UE, a third upper layer signaling message comprising a direct communications request, wherein the direct communications request comprises a unicast type, an upper layer identifier of the UE, an upper layer identifier of the initiator UE, an L2 identifier for the unicast type, an IP address configuration, or a nonce, or a combination thereof and transmitting, to the initiator UE, a fourth upper layer signaling message comprising a direct communications response, wherein the direct communications response comprises an upper layer identifier of the UE, an L2 identifier for unicast communications, or an IP address configuration, or a combination thereof.

Example 59

The method of example 58, further comprising: processing, by a V2X layer of the UE, the third upper layer signaling message, wherein receiving the third upper layer signaling message is based at least in part on the processing.

Example 60

The method of any of examples 50 to 59, further comprising: selecting a set of RRC information elements of the second RRC message; and assigning the set of RRC information elements to the second upper layer signaling message, wherein the assigned set of RRC information elements carry information of the second upper layer signaling message.

Example 61

The method of example 60, further comprising: processing, by an RRC layer of the UE, the second RRC message comprising the assigned set of RRC information elements carrying the information of the second upper layer signaling message, wherein processing, by the RRC layer of the UE, the second RRC message comprises: transmitting, to a V2X layer, an indication of the RRC layer signaling procedure and the information carried in the second upper layer signaling message.

Example 62

An apparatus comprising at least one means for performing a method of any of examples 50 to 61.

Example 63

An apparatus for wireless communications comprising a processor; and memory coupled to the processor, the processor and memory configured to perform a method of any of examples 50 to 61.

Example 64

A non-transitory computer-readable medium storing code for wireless communications, the code comprising instructions executable by a processor to perform a method of any of examples 50 to 61.

Example 65

A method for wireless communications at a UE, comprising: transmitting, via an RRC layer of the UE, an RRC message based at least in part on receiving a second RRC message from an initiator UE as part of an RRC layer signaling procedure; and transmitting, via a V2X layer of the UE, an upper layer signaling message to an initiator UE before or after the RRC layer signaling procedure based at least in part on receiving a second upper layer signaling message from the initiator UE.

Example 66

The method of example 65, wherein the second upper layer signaling message comprises a discovery request comprising a unicast type, an upper layer identifier of the UE, an upper layer identifier of the UE, or an L2 identifier for the unicast type, or a combination thereof.

Example 67

The method of any of examples 65 or 66, wherein the upper layer signaling message comprises a discovery response comprising an upper layer identifier of the initiator UE, or an L2 identifier for unicast communications, or a combination thereof.

Example 68

The method of any of examples 65 to 67, wherein the second upper layer signaling message comprises a direct communications request comprising a unicast type, an upper layer identifier of the UE, an upper layer identifier of the initiator UE, an L2 identifier for the unicast type, an IP address configuration, or a nonce, or a combination thereof.

Example 69

The method of any of examples 65 to 68, wherein the upper layer signaling message comprises a direct communications response comprising an upper layer identifier of the UE, an L2 identifier for unicast communications, or an IP address configuration, or a combination thereof.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting, via a vehicle-to-everything layer of the UE, an upper layer signaling message to a target UE before initiating a radio resource control layer signaling procedure, the upper layer signaling message comprises a request comprising a unicast type, an upper layer identifier of the target UE, an upper layer identifier of the UE, or a layer 2 (L2) identifier for the unicast type, or a combination thereof;
    transmitting, via a radio resource control layer of the UE, a first radio resource control message based at least in part on the radio resource control layer signaling procedure;
    receiving a second radio resource control message from the target UE based at least in part on the radio resource control layer signaling procedure, wherein the second radio resource control message comprises a response comprising an access stratum (AS) layer capability, a sidelink bearer resource configuration response, a Quality-of-Service (QoS) parameter, or a transmit (Tx) profile parameter, or a combination thereof; and
    transmitting, to the target UE, a third radio resource control message in response to receiving the second radio resource control message from the target UE.

2. The method of claim 1, further comprising:
    receiving, from the target UE, a second upper layer signaling message comprising a discovery response comprising the upper layer identifier of the target UE, or an L2 identifier for at least a portion of unicast communications, or a combination thereof.

3. The method of claim 1, further comprising:
    receiving, from the target UE, a second upper layer signaling message comprising a direct communications response comprising the upper layer identifier of the target UE, an L2 identifier for unicast communications, or an internet protocol (IP) address configuration, or a combination thereof.

4. The method of claim 1, further comprising:
    wherein the first radio resource control message comprises a request comprising a UE capability, a sidelink bearer configuration, the QoS parameter, or the Tx profile parameter, or a combination thereof.

5. The method of claim 4, further comprising:
    receiving the second radio resource control message from the target UE based at least in part on the radio resource control layer signaling procedure, wherein the second radio resource control message comprises a rejection; and
    releasing the radio resource control layer signaling procedure based at least in part on the rejection.

6. The method of claim 5, further comprising:
    performing a second radio resource control layer signaling procedure between the UE and the target UE based at least in part on the releasing and a backoff mechanism, wherein the backoff mechanism comprises a timing delay between releasing the radio resource control layer signaling procedure and performing the second radio resource control layer signaling procedure.

7. The method of claim 1, wherein the upper layer signaling message comprises a direct communications request comprising the unicast type, the upper layer identifier of the target UE, the upper layer identifier of the UE, the L2 identifier for the unicast type, an internet protocol (IP) address configuration, or a nonce, or a combination thereof.

8. A method for wireless communications at a user equipment (UE), comprising:
    transmitting, via a radio resource control layer of the UE, a first radio resource control message based at least in part on a radio resource control layer signaling procedure;
    receiving a second radio resource control message from a target UE based at least in part on the radio resource control layer signaling procedure, wherein the second radio resource control message comprises a response comprising an access stratum (AS) layer capability, a sidelink bearer resource configuration response, a Quality-of-Service (QoS) parameter, or a transmit (Tx) profile parameter, or a combination thereof;
    transmitting, to the target UE, a third radio resource control message based at least in part on receiving the second radio resource control message from the target UE; and
    transmitting, via a vehicle-to-everything layer of the UE, an upper layer signaling message to the target UE after initializing the radio resource control layer signaling procedure, wherein the upper layer signaling message comprises a request comprising a unicast type, an upper layer identifier of the target UE, an upper layer identifier of the UE, or a layer 2 (L2) identifier for the unicast type, or a combination thereof.

9. The method of claim 8, further comprising:
    receiving, from the target UE, a second upper layer signaling message comprising a discovery response comprising the upper layer identifier of the target UE, or an L2 identifier for unicast communications, or a combination thereof.

10. The method of claim 8, further comprising:
    receiving, from the target UE, a second upper layer signaling message comprising a direct communications response comprising the upper layer identifier of the target UE, an L2 identifier for unicast communications, or an internet protocol (IP) address configuration, or a combination thereof.

11. The method of claim 8, further comprising:
    wherein the first radio resource control message comprises a second request comprising a UE capability, a sidelink bearer configuration, the QoS parameter, or the Tx profile parameter, or a combination thereof.

12. The method of claim 11, further comprising:
    receiving the second radio resource control message from the target UE based at least in part on the radio resource control layer signaling procedure, wherein the second radio resource control message comprises a rejection; and
    releasing the radio resource control layer signaling procedure based at least in part on the rejection.

13. The method of claim 12, further comprising:
    performing a second radio resource control layer signaling procedure between the UE and the target UE based at least in part on the releasing and a backoff mechanism, wherein the backoff mechanism comprises a timing delay between releasing the radio resource control layer signaling procedure and performing the second radio resource control layer signaling procedure.

14. The method of claim 8, wherein the upper layer signaling message comprises a direct communications request comprising the unicast type, the upper layer identifier of the target UE, the upper layer identifier of the UE, the L2 identifier for the unicast type, an internet protocol (IP) address configuration, or a nonce, or a combination thereof.

15. A method for wireless communications at a user equipment (UE), comprising:
   initiating a radio resource control layer signaling procedure between the UE and a target UE;
   including an upper layer signaling message in a first radio resource control message based at least in part on the radio resource control layer signaling procedure;
   transmitting the first radio resource control message comprising the upper layer signaling message to the target UE;
   receiving, from the target UE, a second radio resource control message comprising a second upper layer signaling message based at least in part on the transmitting; and
   transmitting, to the target UE, a third radio resource control message based at least in part on receiving the second radio resource control message from the target UE.

16. The method of claim 15, wherein the radio resource control layer signaling procedure comprises a radio resource control connection procedure.

17. The method of claim 15, wherein including the upper layer signaling message in the first radio resource control message comprises:
   appending a payload of the upper layer signaling message to a payload of the first radio resource control message.

18. The method of claim 15, wherein the first radio resource control message comprises a request comprising a UE capability, a sidelink bearer configuration, a Quality-of-Service (QoS) parameter, or a transmit (Tx) profile parameter, or a combination thereof.

19. The method of claim 15, wherein the upper layer signaling message comprises a direct communications request comprising a unicast type, an upper layer identifier of the target UE, an upper layer identifier of the UE, a layer 2 (L2) identifier for the unicast type, an internet protocol (IP) address configuration, or a nonce, or a combination thereof.

20. The method of claim 15, wherein the second radio resource control message comprises a response comprising an access stratum (AS) layer capability, a sidelink bearer resource configuration response, a Quality-of-Service (QoS) parameter, or a transmit (Tx) profile parameter, or a combination thereof.

21. The method of claim 15, wherein the second upper layer signaling message comprises a direct communications response comprising an upper layer identifier of the target UE, a layer 2 (L2) identifier for at least a portion of unicast communications, or an internet protocol (IP) address configuration, or a combination thereof.

22. The method of claim 15, wherein the second radio resource control message comprises a rejection.

23. The method of claim 22, wherein the second upper layer signaling message associated with the rejection comprises a failure cause indication.

24. The method of claim 15, wherein the upper layer signaling message comprises a request comprising a unicast type, an upper layer identifier of the target UE, an upper layer identifier of the UE, or a layer 2 (L2) identifier for the unicast type, or a combination thereof.

25. An apparatus for wireless communications at a user equipment (UE), comprising:
   a processor, and
   memory coupled to the processor, the processor and memory configured to:
      transmit, via a vehicle-to-everything layer of the UE, an upper layer signaling message to a target UE before initiating a radio resource control layer signaling procedure, the upper layer signaling message comprises a request comprising a unicast type, an upper layer identifier of the target UE, an upper layer identifier of the UE, or a layer 2 (L2) identifier for the unicast type, or a combination thereof;
      transmit, via a radio resource control layer of the UE, a first radio resource control message based at least in part on the radio resource control layer signaling procedure;
      receive a second radio resource control message from the target UE based at least in part on the radio resource control layer signaling procedure, wherein the second radio resource control message comprises a response comprising an access stratum (AS) layer capability, a sidelink bearer resource configuration response, a Quality-of-Service (QoS) parameter, or a transmit (Tx) profile parameter, or a combination thereof; and
      transmit, to the target UE, a third radio resource control message in response to receiving the second radio resource control message from the target UE.

* * * * *